(12) United States Patent
Lohnes et al.

(10) Patent No.: US 11,974,582 B2
(45) Date of Patent: May 7, 2024

(54) APPARATUS AND METHODS FOR MOLLUSC PROCESSING

(71) Applicant: CLEARWATER SEAFOODS LIMITED PARTNERSHIP, Bedford (CA)

(72) Inventors: Keith Lohnes, Lunenburg (CA); Tracy Rose, Middle Sackville (CA); Mike McDonald, Lunenburg County (CA); Elizabeth J M Dickson, Halifax (CA); Fanel Vasile, Hammonds Plains (CA); William A. Nauss, Halifax (CA)

(73) Assignee: CLEARWATER SEAFOODS LIMITED PARTNERSHIP, Bedford (CA)

( * ) Notice: Subject to any disclaimer, the term of this patent is extended or adjusted under 35 U.S.C. 154(b) by 195 days.

(21) Appl. No.: 17/631,543

(22) PCT Filed: Jul. 28, 2020

(86) PCT No.: PCT/CA2020/051033
§ 371 (c)(1),
(2) Date: Jan. 31, 2022

(87) PCT Pub. No.: WO2021/016705
PCT Pub. Date: Feb. 4, 2021

(65) Prior Publication Data
US 2022/0279804 A1    Sep. 8, 2022

Related U.S. Application Data

(60) Provisional application No. 62/881,418, filed on Aug. 1, 2019.

(51) Int. Cl.
A22C 29/00    (2006.01)
A22C 29/04    (2006.01)

(52) U.S. Cl.
CPC .................................. *A22C 29/046* (2013.01)

(58) Field of Classification Search
CPC ...... A22C 29/04; A22C 29/046; A22C 29/043
(Continued)

(56) References Cited

U.S. PATENT DOCUMENTS

| 848,608 A | 3/1907 | Torsch et al. |
| 848,784 A | 4/1907 | Torsch et al. |

(Continued)

FOREIGN PATENT DOCUMENTS

| AU | 6019286 A | 12/1986 |
| AU | 752504 B2 | 9/2002 |

(Continued)

OTHER PUBLICATIONS

International PCT Search Report and Written Opinion dated Oct. 23, 2020 in respect of International PCT Application No. PCT/CA2020/051033 (12 pages).

(Continued)

*Primary Examiner* — Richard T Price, Jr.
(74) *Attorney, Agent, or Firm* — Michael Best & Friedrich LLP

(57) ABSTRACT

Mollusc processing apparatus and related methods are disclosed. The molluscs have a first shell, a second shell and an adductor muscle attached to the shells. Multiple holders hold a respective mollusc by the first shell of the mollusc. A conveyor is coupled to the holders to move the molluscs between processing stations. One processing station is a shell cut station to cut an opening into the shells of each respective mollusc. Another processing station is a muscle cut station to cut the adductor muscle from the second shell through the opening in the shells of each mollusc. A further processing station is a shell detach station to detach the second shell from the first shell of each respective mollusc.

19 Claims, 31 Drawing Sheets

(58) Field of Classification Search
USPC .......................................................... 452/13
See application file for complete search history.

(56) References Cited

U.S. PATENT DOCUMENTS

| | | | |
|---|---|---|---|
| 1,445,672 A | 2/1923 | Egli | |
| 3,320,631 A | 5/1967 | Brown | |
| 3,473,191 A * | 10/1969 | Evans | A22C 29/046 |
| | | | 452/14 |
| 3,583,026 A | 6/1971 | Peoni | |
| 3,722,035 A | 3/1973 | Hanks | |
| 3,724,031 A | 4/1973 | Sterling et al. | |
| 3,828,398 A * | 8/1974 | Harris | A22C 29/046 |
| | | | 269/26 |
| 3,934,311 A | 1/1976 | Thompson | |
| 3,964,130 A | 6/1976 | Bertrand | |
| 3,975,797 A | 8/1976 | Grimes et al. | |
| 3,988,805 A | 11/1976 | Martin | |
| 3,991,466 A | 11/1976 | Smith | |
| 4,003,103 A | 1/1977 | Wenstrom et al. | |
| 4,005,504 A | 2/1977 | Lapeyre | |
| 4,030,164 A | 6/1977 | Fick | |
| 4,059,870 A | 11/1977 | Finkelman | |
| 4,069,552 A | 1/1978 | Priggs | |
| 4,073,041 A | 2/1978 | Davis et al. | |
| 4,083,084 A | 4/1978 | Davis | |
| 4,087,887 A | 5/1978 | Hoffman et al. | |
| 4,124,920 A | 11/1978 | Wenstrom et al. | |
| 4,141,114 A | 2/1979 | Carlson | |
| 4,143,444 A | 3/1979 | Cox | |
| 4,148,112 A | 4/1979 | Marvin | |
| 4,198,728 A | 4/1980 | Cohen | |
| 4,236,276 A | 12/1980 | Van Twuyver et al. | |
| 4,249,283 A | 2/1981 | Blakeslee | |
| 4,255,834 A | 3/1981 | Lambert | |
| 4,255,835 A | 3/1981 | Demulder | |
| 4,279,934 A | 7/1981 | Hutchison et al. | |
| 4,301,571 A | 11/1981 | Blakeslee | |
| 4,304,029 A | 12/1981 | Cox | |
| 4,309,793 A | 1/1982 | Martin | |
| 4,312,099 A | 1/1982 | Cohen | |
| 4,313,241 A | 2/1982 | Comparetto | |
| 4,324,020 A | 4/1982 | Garwin et al. | |
| 4,329,761 A | 5/1982 | Olsson | |
| 4,330,904 A | 5/1982 | Lambert | |
| 4,332,057 A | 6/1982 | Smith | |
| 4,348,788 A | 9/1982 | Jurcak | |
| 4,361,933 A | 12/1982 | Rodman et al. | |
| 4,383,348 A | 5/1983 | Comparetto | |
| 4,393,545 A | 7/1983 | O'Donnell | |
| 4,393,546 A | 7/1983 | Ruiz | |
| 4,420,492 A | 12/1983 | Taylor | |
| 4,467,501 A | 8/1984 | Guglielmo et al. | |
| 4,477,943 A | 10/1984 | Grush, Jr. | |
| 4,505,004 A | 3/1985 | Joensen | |
| 4,532,677 A | 8/1985 | Wenstrom et al. | |
| 4,535,507 A | 8/1985 | Reinke | |
| 4,551,886 A | 11/1985 | Couche et al. | |
| 4,564,978 A | 1/1986 | Reinke | |
| 4,590,644 A | 5/1986 | Maniscalco | |
| 4,610,052 A | 9/1986 | Lubcke | |
| 4,633,547 A | 1/1987 | Caroon | |
| 4,663,805 A | 5/1987 | Adcock et al. | |
| 4,674,154 A | 6/1987 | Gilbert et al. | |
| 4,675,946 A | 6/1987 | Bunge et al. | |
| 4,688,679 A | 8/1987 | Lindgren | |
| 4,691,412 A | 9/1987 | Brown | |
| 4,715,091 A | 12/1987 | Rome | |
| 4,718,145 A | 1/1988 | Silchenstedt | |
| 4,722,117 A | 2/1988 | McGuire | |
| 4,770,894 A | 9/1988 | Usui et al. | |
| 4,787,123 A | 11/1988 | Geddings | |
| 4,796,333 A | 1/1989 | Stinson, Jr. et al. | |
| 4,802,260 A | 2/1989 | Fletcher | |
| 4,870,719 A | 10/1989 | Harris | |
| 4,887,333 A | 12/1989 | Gallant | |
| 4,897,896 A | 2/1990 | Gallant | |
| 4,901,401 A | 2/1990 | Gallant | |
| 4,903,373 A | 2/1990 | Chouinard et al. | |
| 4,916,775 A | 4/1990 | Gallant | |
| 4,924,555 A | 5/1990 | Gifford | |
| 4,935,991 A | 6/1990 | Tourney | |
| 4,939,814 A | 7/1990 | Tillion | |
| 4,951,356 A | 8/1990 | Delplanque | |
| 4,968,523 A | 11/1990 | Usui et al. | |
| 5,059,151 A | 10/1991 | Kiczek | |
| 5,145,448 A | 9/1992 | Ebisuzaki | |
| 5,151,062 A | 9/1992 | Pontow | |
| 5,178,577 A | 1/1993 | Kirk | |
| 5,261,854 A | 11/1993 | Eiriksson | |
| 5,288,263 A | 2/1994 | Ayala | |
| 5,334,080 A | 8/1994 | Webb | |
| 5,399,117 A | 3/1995 | Telford | |
| 5,401,208 A | 3/1995 | Marvin | |
| 5,427,567 A | 6/1995 | Adcock | |
| 5,482,500 A | 1/1996 | Boettner et al. | |
| 5,580,303 A | 12/1996 | Winslow et al. | |
| 5,599,228 A | 2/1997 | Thibault | |
| 5,679,392 A | 10/1997 | Schegan et al. | |
| 5,773,064 A | 6/1998 | Tesvich et al. | |
| 5,779,530 A | 7/1998 | Agote | |
| 5,788,562 A | 8/1998 | Renaut et al. | |
| 5,800,256 A | 9/1998 | Bermudez | |
| 5,800,257 A | 9/1998 | Craig | |
| 5,836,266 A | 11/1998 | Watanabe | |
| 5,947,808 A | 9/1999 | Adams | |
| 5,976,601 A | 11/1999 | Tesvich et al. | |
| 5,989,117 A | 11/1999 | Lin | |
| 6,010,397 A | 1/2000 | Adams et al. | |
| 6,086,468 A * | 7/2000 | Yoshida | A22C 29/046 |
| | | | 452/14 |
| 6,099,399 A | 8/2000 | Hearn et al. | |
| 6,110,032 A | 8/2000 | Earnshaw | |
| 6,129,622 A | 10/2000 | Seaman et al. | |
| 6,132,303 A | 10/2000 | Buckhaven | |
| 6,190,247 B1 | 2/2001 | Reimer et al. | |
| 6,193,596 B1 | 2/2001 | Adcock | |
| 6,217,435 B1 | 4/2001 | Voisin | |
| 6,238,716 B1 | 5/2001 | Prins | |
| 6,244,948 B1 | 6/2001 | LiRosi | |
| 6,274,188 B1 | 8/2001 | Ledet et al. | |
| 6,390,911 B1 | 5/2002 | Lombardo | |
| 6,393,977 B1 | 5/2002 | Voisin | |
| 6,398,635 B1 | 6/2002 | DeMezzo | |
| 6,426,103 B2 | 7/2002 | Voisin | |
| 6,468,142 B1 | 10/2002 | Deyerle et al. | |
| 6,537,601 B1 | 3/2003 | Voisin | |
| 6,736,716 B1 * | 5/2004 | Sugiyama | A22C 29/046 |
| | | | 452/2 |
| 6,776,700 B2 | 8/2004 | Davy | |
| 7,582,005 B1 | 9/2009 | Le | |
| 7,748,313 B2 | 7/2010 | Tyndall | |
| 8,109,810 B2 | 2/2012 | Blenkinsopp et al. | |
| 8,591,296 B2 | 11/2013 | Sekretta et al. | |
| 2001/0041212 A1 | 11/2001 | Tafu et al. | |
| 2002/0009534 A1 | 1/2002 | Voisin | |
| 2002/0019207 A1 | 2/2002 | Maille | |
| 2003/0013400 A1 | 1/2003 | Auguin | |
| 2003/0134585 A1 | 7/2003 | Maloni | |
| 2003/0224709 A1 | 12/2003 | Davy | |
| 2004/0194718 A1 | 10/2004 | McRae | |
| 2004/0219871 A1 | 11/2004 | Hansen | |
| 2005/0282481 A1 | 12/2005 | Banke | |
| 2006/0029922 A1 | 2/2006 | Van Eelen et al. | |
| 2006/0105689 A1 | 5/2006 | Lopez et al. | |
| 2006/0205332 A1 | 9/2006 | Raghubeer et al. | |
| 2007/0042694 A1 | 2/2007 | Enriquez et al. | |
| 2007/0042695 A1 | 2/2007 | Chong et al. | |
| 2007/0049187 A1 | 3/2007 | Le | |
| 2007/0077877 A1 | 4/2007 | Cross | |
| 2007/0128293 A1 | 6/2007 | Lopez et al. | |
| 2007/0224926 A1 | 9/2007 | Adcock | |
| 2007/0254569 A1 | 11/2007 | Jabbour et al. | |

(56) References Cited

U.S. PATENT DOCUMENTS

| | | |
|---|---|---|
| 2009/0208622 A1 | 8/2009 | Voisin |
| 2010/0048113 A1 | 2/2010 | Blenkinsopp et al. |
| 2012/0214389 A1 | 8/2012 | Sekretta et al. |

FOREIGN PATENT DOCUMENTS

| | | |
|---|---|---|
| CA | 916610 A | 12/1972 |
| CA | 967314 A | 5/1975 |
| CA | 988362 A | 5/1976 |
| CA | 1034722 A | 7/1978 |
| CA | 1104771 A | 7/1978 |
| CA | 1064657 A | 10/1979 |
| CA | 1094872 A | 2/1981 |
| CA | 1101620 A | 5/1981 |
| CA | 1102058 A | 6/1981 |
| CA | 1122765 A | 5/1982 |
| CA | 1127810 A | 7/1982 |
| CA | 1138609 A | 1/1983 |
| CA | 1139062 A | 1/1983 |
| CA | 1139063 A | 1/1983 |
| CA | 1141113 A | 2/1983 |
| CA | 1150456 A | 7/1983 |
| CA | 1164166 A | 3/1984 |
| CA | 1188466 A | 6/1985 |
| CA | 1195065 A | 10/1985 |
| CA | 1201562 A | 3/1986 |
| CA | 1205963 A | 6/1986 |
| CA | 1211604 A | 9/1986 |
| CA | 1219711 A | 3/1987 |
| CA | 1226111 A | 9/1987 |
| CA | 1234259 A | 3/1988 |
| CA | 1239004 A | 7/1988 |
| CA | 1269564 A | 5/1990 |
| CA | 2003007 C | 5/1990 |
| CA | 2003020 C | 5/1990 |
| CA | 2012612 A1 | 1/1991 |
| CA | 1282917 C | 4/1991 |
| CA | 2024002 A1 | 4/1991 |
| CA | 2015487 A1 | 5/1991 |
| CA | 2015863 C | 5/1991 |
| CA | 1297245 C | 3/1992 |
| CA | 2025761 A1 | 3/1992 |
| CA | 2025762 A1 | 3/1992 |
| CA | 1300422 C | 5/1992 |
| CA | 2111227 C | 12/1992 |
| CA | 1314758 C | 3/1993 |
| CA | 2084168 C | 6/1993 |
| CA | 2086376 C | 12/1993 |
| CA | 2136061 C | 5/1995 |
| CA | 2181762 C | 1/1997 |
| CA | 2201803 C | 5/1997 |
| CA | 2193746 A1 | 8/1997 |
| CA | 2252220 A1 | 10/1997 |
| CA | 2211055 A1 | 2/1998 |
| CA | 2192251 A1 | 6/1998 |
| CA | 2284644 A1 | 10/1998 |
| CA | 2291827 C | 12/1998 |
| CA | 2264184 C | 9/1999 |
| CA | 2418248 A1 | 11/1999 |
| CA | 2240079 A1 | 1/2000 |
| CA | 2377033 A1 | 2/2001 |
| CA | 2111227 C | 8/2002 |
| CA | 2434925 A1 | 2/2004 |
| CA | 2310912 C | 11/2004 |
| CA | 2430635 A1 | 12/2004 |
| CA | 2383726 C | 9/2005 |
| CA | 2464708 A1 | 10/2005 |
| CA | 2566615 A1 | 12/2005 |
| CA | 2474120 A1 | 1/2006 |
| CA | 2245414 C | 4/2006 |
| CA | 2548237 C | 1/2008 |
| CA | 2338499 C | 7/2010 |
| CN | 106259819 A | 1/2017 |
| CN | 107712017 A | 2/2018 |
| CN | 109221358 A | 1/2019 |
| CN | 109329372 A | 2/2019 |
| FR | 2546722 A1 | 12/1984 |
| GB | 976767 A | 12/1964 |
| JP | 5428876 A | 3/1979 |
| JP | 04016144 A | 1/1992 |
| JP | 4207149 A | 7/1992 |
| JP | 5176672 A | 7/1993 |
| JP | 05308894 A | 11/1993 |
| JP | 7274813 A | 10/1995 |
| JP | 8009879 A | 1/1996 |
| JP | 8322459 A | 7/1997 |
| JP | 09275891 A | 10/1997 |
| JP | 9308433 A | 12/1997 |
| JP | 11127771 A | 5/1999 |
| JP | 11151063 A | 6/1999 |
| JP | 11206312 A | 8/1999 |
| JP | 2000125758 A | 5/2000 |
| JP | 2000270762 A | 10/2000 |
| JP | 2001178355 A | 7/2001 |
| JP | 2002330696 A | 11/2002 |
| JP | 2004016019 A | 1/2004 |
| JP | 9275889 A | 8/2005 |
| JP | 2008104438 A | 5/2008 |
| JP | 2002125583 A | 12/2008 |
| JP | 2018038279 A | 3/2018 |
| WO | 9400022 A1 | 1/1994 |
| WO | 1998042197 A1 | 10/1998 |
| WO | 1999031992 A1 | 7/1999 |
| WO | 9953771 A1 | 10/1999 |
| WO | 2005089559 A1 | 9/2005 |
| WO | 2017037864 A1 | 3/2017 |

OTHER PUBLICATIONS

F.W. Wheaton, Completion Report, Project No. 3-152-D, University of Maryland, May 1, 1971-Jun. 30, 1973, 58 pages.

Martin, Daniel E., et al., International Journal of Food Science and Technology, Oyster shucking technologies: past and present, 2006, 41, pp. 223-232.

R. Hardy & J.G.M. Smith, "Catching and Processing Scallops and Queens", Ministry of Agriculture, Fisheries and Food; http://www.fao.org/wairdocs/tan/x5923E/x5923e00.htm, 2001, 10 pages.

F. Wheaton & S. Hall, "Research needs for automated oyster shucking", Aquacultural Engineering 37 (2007) 67-72.

F. Wheaton, "Review of oyster shell properties, Part II. Thermal properties", Aquacultural Engineering 37 (2007) 14-23.

F. Wheaton, "Review of the properties of Eastern oysters, *Crassostrea virginica* Part I. Physical properties", Aquacultural Engineering 37 (2007) 3-13.

F. Wheaton, "Oyster shell-meat sensor", Aquacultural Engineering 38 (2008) 127-134.

Office Action dated Mar. 14, 2023 in respect of CN202080055311.1 (24 pages).

Office Action dated Aug. 19, 2022 in respect of CN202080055311.1 (21 pages).

International PCT Search Report and Written Opinion dated Apr. 4, 2011 in respect of International PCT Application No. PCTCA2010001696 (7 pages).

* cited by examiner

APPARATUS AND METHODS FOR MOLLUSC PROCESSING

CROSS-REFERENCE TO RELATED APPLICATIONS

This application is a National Stage of International Application No. PCT/CA2020/051033, which claims priority to, U.S. Provisional Patent Application No. 62/881,418 filed on Aug. 1, 2019, the entire contents of both of which are hereby incorporated herein by reference.

FIELD OF THE INVENTION

This invention relates generally to seafood processing and, in particular, to processing molluscs.

Background

Removal of the adductor muscle from scallops, also referred to as "shucking", has typically been a manual process. A knife blade is inserted through an opening near the hinge between the two shells of a scallop and used to cut the adductor muscle from the top shell. The top shell and viscera are then pulled away from the bottom shell and discarded, and the adductor muscle is cut from the bottom shell in a second cut.

This type of manual shucking process can be quite physically demanding, and hand and wrist problems and repetitive strain injuries are common. In addition, manual shucking speed is limited to physical capability of a human worker and is often the bottleneck in a factory setting. Product quality consistency can also be an issue. Edible product yields can thus vary from person to person, both in the number of scallops processed and the amount of the adductor muscle that remains attached to the shells after shucking and therefore is wasted.

Summary

According to one aspect of the present disclosure, there is provided an apparatus including a plurality of holders, a cutter and an actuator. Each holder of the plurality of holders is to hold a respective mollusc by a first shell of the mollusc and is alignable with other holders of the plurality of holders in a direction. Each respective mollusc has a pair of shells including the first shell and a second shell. The cutter is operable to cut the shells of the molluscs. The actuator is coupled to the cutter, to operate the cutter responsive to alignment of multiple holders of the plurality of holders in the direction, to cut an opening into the shells of the respective mollusc held by each holder of the multiple holders that are aligned in the direction.

In some embodiments, the apparatus further includes a clamping system to clamp the second shell of each mollusc toward the first shell. The clamping system could optionally include an inflatable bladder, and possibly a further actuator to press the inflatable bladder against the second shell of at least one mollusc. In some embodiments, the further actuator includes a pneumatic piston.

In some embodiments, the apparatus further includes a conveyor having a plurality of lanes of the holders.

In some embodiments, the cutter is aligned in the same direction as the multiple holders.

In some embodiments, the actuator is further to move the cutter between a first position and a second position.

In some embodiments, the cutter includes a sawblade.

In some embodiments, the plurality of holders includes a holder that defines a concavity to hold the first shell of the respective mollusc. Optionally, the concavity includes a ribbed surface. A length of the concavity could be less than a length of the shells of the respective mollusc such that a portion of the shells of the mollusc extends beyond an edge of the holder, and the opening could be cut into the portion of the shells of the mollusc.

In some embodiments, the plurality of holders includes a holder that includes a stop to abut a hinge connecting the shells of the respective mollusc, the stop being oriented toward a rear of the holder relative to a direction of motion of the holder during operation of the apparatus.

According to another aspect of the present invention, there is provided an apparatus including a holder to hold a mollusc by a first shell, the mollusc initially having a pair of shells, including the first shell and a second shell, and an adductor muscle attached to the shells. The apparatus further includes a clamping system to clamp the second shell toward the first shell, and to further hold the first shell in some embodiments.

In some embodiments, the apparatus further includes a shell cut station to cut an opening into the shells of the mollusc.

In some embodiments, the clamping system includes an inflatable bladder, and possibly a further actuator to press the inflatable bladder against the second shell of at least one mollusc. In some embodiments, the further actuator includes a pneumatic piston.

In some embodiments, the apparatus further includes a cutter operable to cut the adductor muscle from the second shell through an opening between the first shell and the second shell. Optionally, the cutter includes a flexible cutting blade. The cutting blade could be movable from a first position out of contact with the mollusc to a second position in which at least a portion of the cutting blade is between the shells, to cut the adductor muscle from the second shell. In some embodiments, the cutting blade contacts and follows an inside surface of the second shell as the cutting blade is moved from its first position to its second position.

In some embodiments, the clamping system includes a spring to clamp the second shell toward the first shell. Optionally, the spring is a first spring, and the clamping system further includes a second spring to clamp the second shell toward the first shell. The clamping system could also or instead include a suction grip to extend through a hole in the holder, to hold the first shell of the mollusc.

In some embodiments, the holder defines a concavity to hold the first shell of the respective mollusc. Optionally, the concavity includes a ribbed surface.

In some embodiments, the holder includes a stop to abut a hinge connecting the shells of the respective mollusc, the stop being oriented toward a rear of the holder relative to a direction of motion of the holder during operation of the apparatus.

According to yet another aspect of the present disclosure, there is provided an apparatus including a holder to hold a mollusc by a first shell, the mollusc initially having a pair of shells, including the first shell and a second shell, and an opening cut into the shells. The apparatus further includes a shell detach mechanism. The shell detach mechanism includes a first member to inhibit movement of the first shell relative to the holder, and a second member, disposed adjacent to the first member, to enter the opening and detach the second shell from the first shell.

In some embodiments, the apparatus further includes a third member to inhibit movement of the first shell relative to the holder, the second member being disposed between the first member and the third member.

In some embodiments, the apparatus further includes a conveyor, coupled to the holder, to move the mollusc relative to the shell detach mechanism. Optionally, the shell detach mechanism is stationary.

In some embodiments, the apparatus further includes a conveyor, coupled to the shell detach mechanism, to move the shell detach mechanism relative to the mollusc. Optionally, the holder is stationary.

In some embodiments, the first member includes a convex surface to slide against the first shell during relative motion between the mollusc and the shell detach mechanism. The second member optionally includes an edge formed by a first surface and a second surface. The first surface could be convex. In some embodiments, the second surface includes a first concave portion adjacent to the edge, a substantially flat portion adjacent to the first concave portion, and a second concave portion adjacent to the substantially flat portion. In some embodiments, during relative motion between the mollusc and the shell detach mechanism, the edge enters the opening, the first surface slides against an inside surface of the first shell to inhibit movement of the first shell relative to the holder, and the second surface slides against the second shell to separate the second shell from the first shell.

In some embodiments, the mollusc further has a hinge connecting the shells, the opening is cut into a side of the shells that is substantially opposite the hinge, and the mollusc moves relative to the shell detach mechanism in a direction that is substantially perpendicular to an axis of the hinge. The holder may include a stop to abut the hinge, the stop being oriented toward a rear of the holder relative to a direction of motion of the holder during operation of the apparatus.

In some embodiments, a height of the first member and a height of the second member are adjustable relative to the holder.

In some embodiments, the holder includes a concavity to hold the first shell of the mollusc. The concavity may include a ribbed surface, for example.

According to a further aspect of the present disclosure, there is provided a system including a plurality of holders, each holder of the plurality of holders being to hold a respective mollusc by a first shell of the mollusc, each respective mollusc having a pair of shells, including the first shell and a second shell, and an adductor muscle attached to the shells. The system further includes a conveyor, coupled to the plurality of holders, to move the molluscs between processing stations. The processing stations include a shell cut station to cut an opening into the shells of each respective mollusc, the shell cut station including an apparatus as described herein; a muscle cut station to cut the adductor muscle from the second shell through the opening in the shells of each respective mollusc, the muscle cut station including an apparatus as described herein; and a shell detach station to detach the second shell from the first shell of each respective mollusc, the shell detach station including an apparatus as described herein.

In some embodiments, the system further includes a controller to: control a motion of the conveyor, the motion of the conveyor including a movement period and a dwell period; control the shell cut station to cut the opening into the shells of at least one mollusc during the dwell period; and control the muscle cut station to cut the adductor muscle from the second shell of at least one further mollusc during the dwell period. The conveyor optionally includes a plurality of lanes of the holders.

According to another aspect of the present disclosure, there is provided a method including moving a plurality of holders between processing stations, each holder of the plurality of holders to hold a respective mollusc by a first shell of the mollusc, each respective mollusc having a pair of shells, including the first shell and a second shell, and an adductor muscle attached to the shells. The method further includes processing the molluscs at the processing stations. The processing stations include a shell cut station to cut an opening into the shells of each respective mollusc, the shell cut station including an apparatus as described herein; a muscle cut station to cut the adductor muscle from the second shell through the opening in the shells of each respective mollusc, the muscle cut station including an apparatus as described herein; and a shell detach station to detach the second shell from the first shell of each respective mollusc, the shell detach station including an apparatus as described herein.

According to yet another aspect of the present disclosure, there is provided a method including providing a plurality of holders, each holder of the plurality of holders to hold a respective mollusc by a first shell of the mollusc, each respective mollusc having a pair of shells, including the first shell and a second shell, and an adductor muscle attached to the shells; and providing processing stations for processing the molluscs. The processing stations include a shell cut station to cut an opening into the shells of each respective mollusc, the shell cut station including an apparatus as described herein; a muscle cut station to cut the adductor muscle from the second shell through the opening in the shells of each respective mollusc, the muscle cut station including an apparatus as described herein; and a shell detach station to detach the second shell from the first shell of each respective mollusc, the shell detach station including an apparatus as described herein. The further includes providing a conveyor, coupled to the plurality of holders, to move the molluscs between the processing stations.

In some embodiments, the method further includes providing a controller to: control a motion of the conveyor, the motion of the conveyor including a movement period and a dwell period; control the shell cut station to cut the opening into the shells of at least one mollusc during the dwell period; and control the muscle cut station to cut the adductor muscle from the second shell of at least one further mollusc during the dwell period.

BRIEF DESCRIPTION OF THE DRAWINGS

Examples of embodiments of the invention will now be described in greater detail with reference to the accompanying drawings.

DETAILED DESCRIPTION

Figure 30:
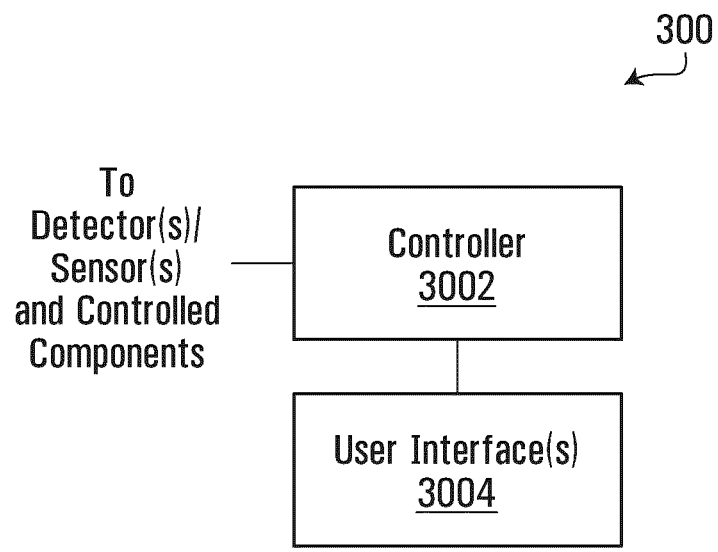
FIG. 30 is a block diagram illustrating an example control system.
Figure 31:
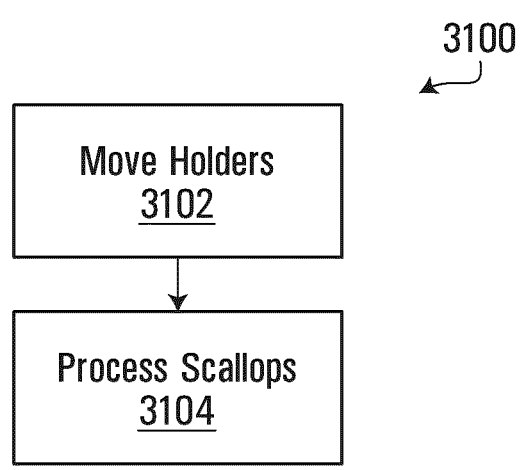
FIGS. 31 and 32 are flow diagrams illustrating methods according to some embodiments.
Figure 32:
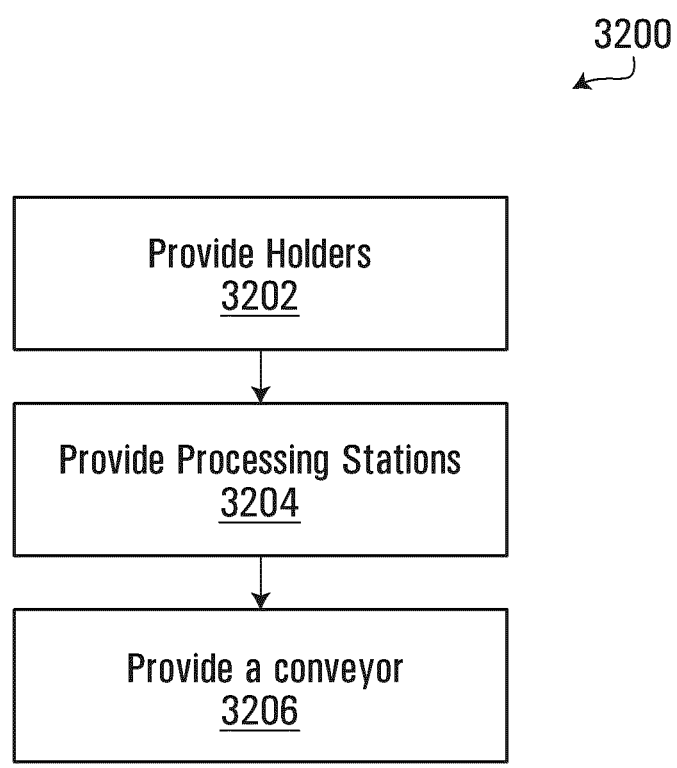

FIGS. 1 to 30 illustrate an example scallop processing system or machine 100 and various components thereof, and FIGS. 31 and 32 illustrate examples of related methods. It should be appreciated, however, that the contents of the drawings are intended solely for illustrative purposes, and that the present invention is in no way limited to the particular example embodiments explicitly shown in the drawings and described herein. A machine may include additional, fewer, and/or different components which are arranged in a similar or different manner than shown, and a method may likewise involve performing additional, fewer, or different operations in a similar or different order.

Figure 1:
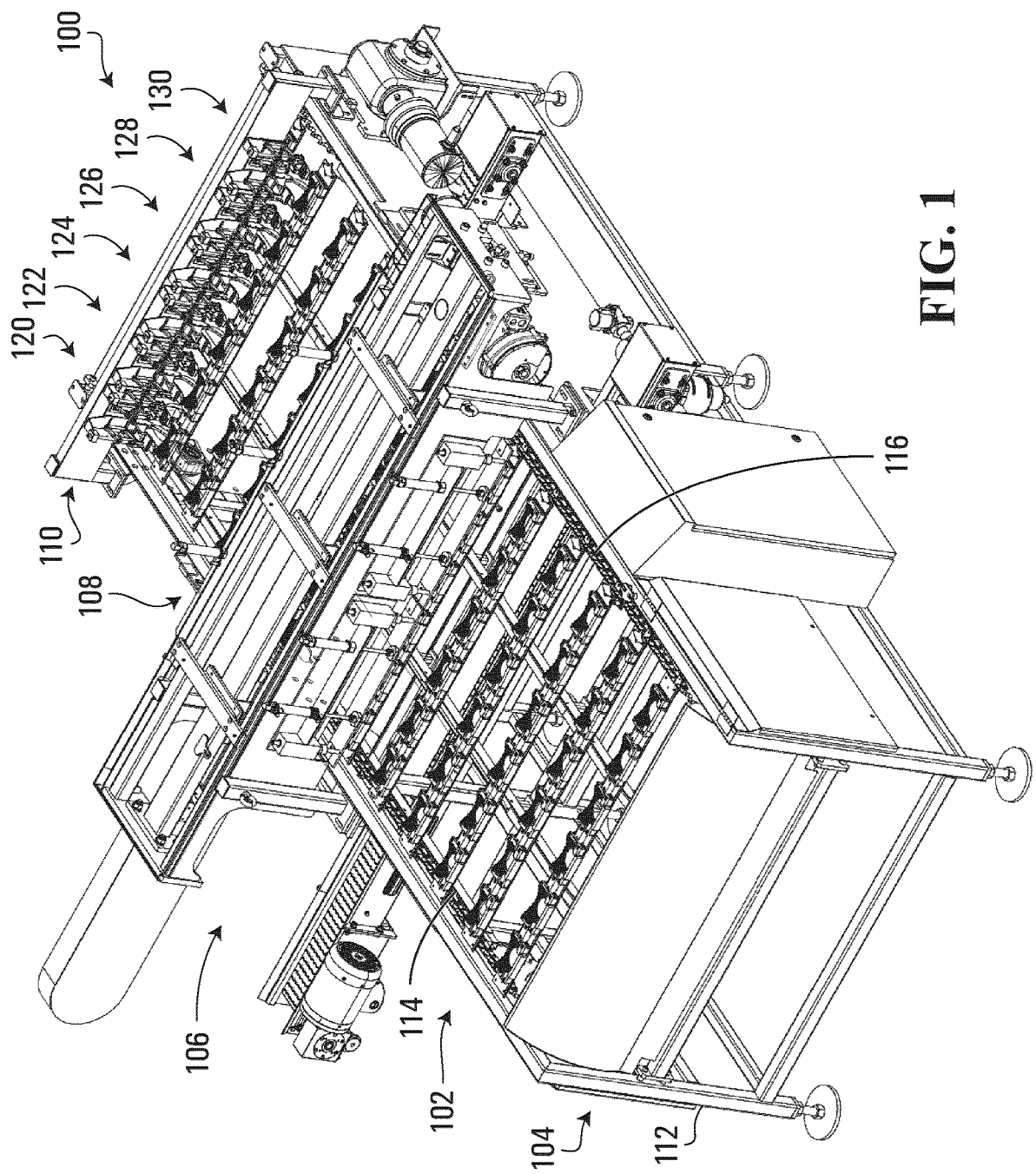
FIGS. 1 and 2 are perspective views of an example scallop processing machine.
Figure 2:
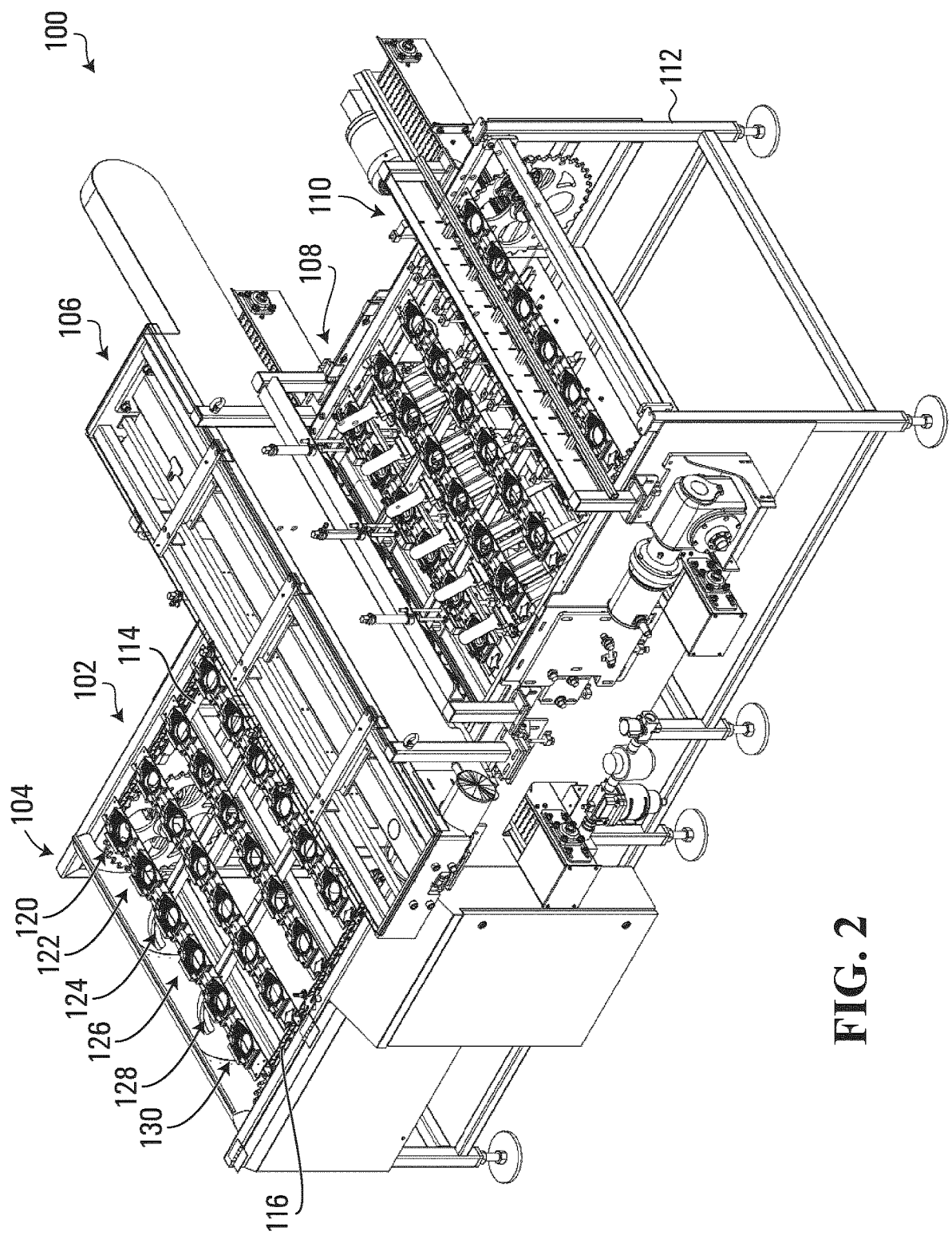

FIGS. 1 and 2 are perspective views of the scallop processing machine 100. The machine 100 includes a chain conveyor 102, a loading station 104, a shell cut station 106, a muscle cut station 108, a shell detach station 110, and a frame 112. The conveyor 102 and the stations 104, 106, 108, 110 are coupled to and supported by the frame 112.

The conveyor 102 defines a flat top surface for processing scallops. The conveyor 102 includes two chains 114, 116 that are engaged with and supported by gears mounted on the frame 112. Each of the chains 114, 116 is adjacent or proximate to a respective side of the machine 100. The chains 114, 116 are coupled to multiple holders that carry scallops between the stations 104, 106, 108, 110. These holders are arranged into six lanes 120, 122, 124, 126, 128, 130 and multiple rows. Each of the lanes 120, 122, 124, 126, 128, 130 is aligned in the direction of the motion of the conveyor 102. Each of the rows of holders consists of six aligned holders, one from each of the lanes 120, 122, 124, 126, 128, 130. The rows of holders are aligned in a direction that is perpendicular to the motion of the conveyor 102. The configuration of lanes and rows of holders is not limited in the embodiments described herein. For example, a scallop processing machine having more or less than six lanes of holders is also contemplated.

The conveyor 102 moves the holders sequentially through the stations 104, 106, 108, 110 to process the scallops that are held by the holders, starting from the loading station 104 and finishing at the shell detach station 110. In the illustrated embodiment, following the shell detach station 110, the processed scallops are removed from the holders, and the holders are inverted and moved back to the loading station 104 to repeat the process with new scallops. In other embodiments, following the shell detach station 110, the processed scallops and the holders can be moved to additional stations (not shown) to further process the scallops.

The motion of the conveyor 102 includes repetitions of movement periods and dwell periods (also referred to as stationary periods). This motion of the conveyor 102 could be considered to be indexed motion. By way of example, the conveyor 102 could move at a particular speed for a first period of time, stop for a second period of time, move at the same or a different speed for a third period of time, stop for a fourth period of time, and so on. The length of each of these periods of time could be the same or different. The conveyor 102 could be driven by an electric motor or some other kind of motor.

A chain conveyor is one type of conveyor for carrying holders and/or scallops between processing stations, but other types of conveyors, including belt conveyors, are also contemplated. In addition, the motion of a conveyor might not always be indexed, and could be continuous in some embodiments. It should also be appreciated that a conveyor is one example of a movement system by which holders and/or scallops may be moved in a processing machine. Other movement systems may be used in other embodiments.

Figure 3:
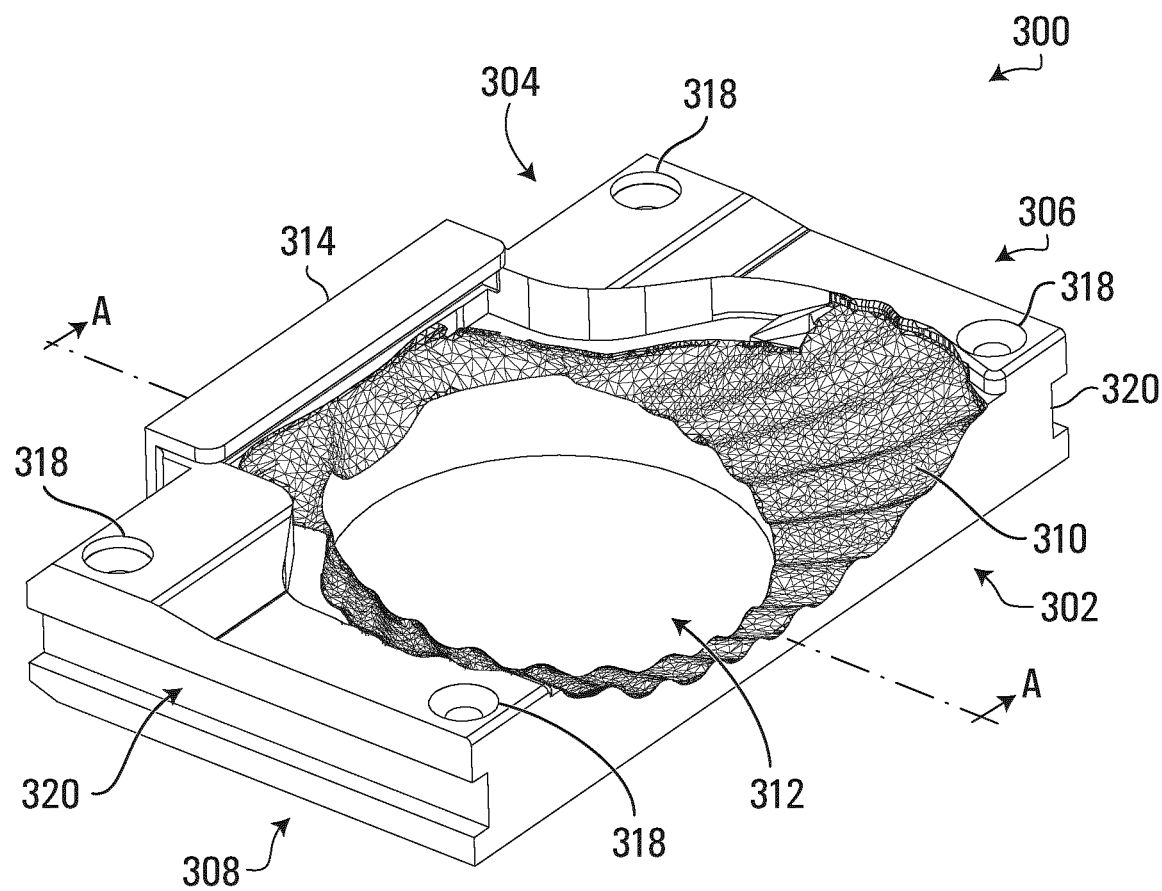
FIG. 3 is a perspective view of an example holder for scallops.
Figure 4:
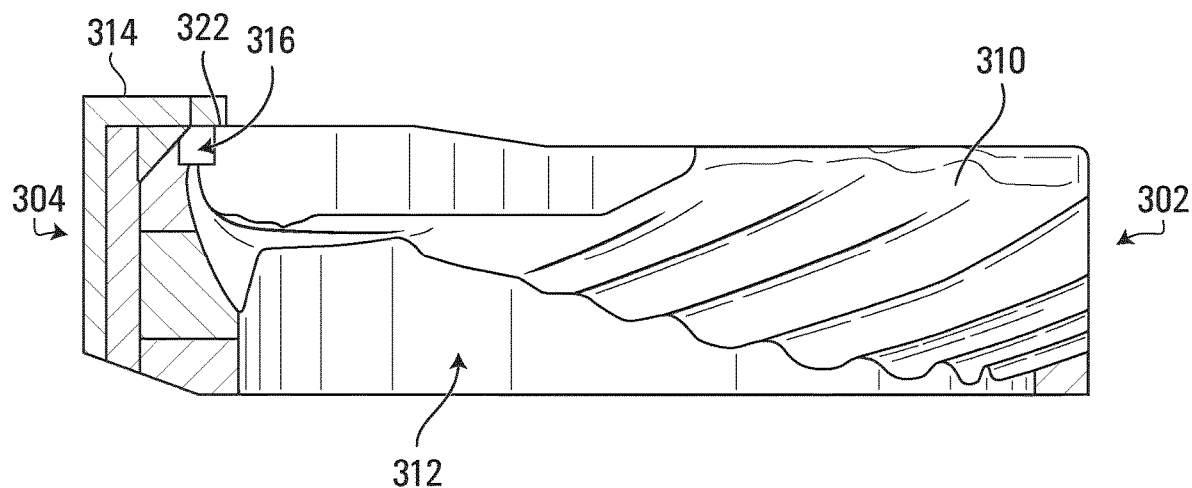
FIG. 4 is a cross-sectional view of the holder illustrated in FIG. 3, along the line A-A in FIG. 3.
Figure 5:
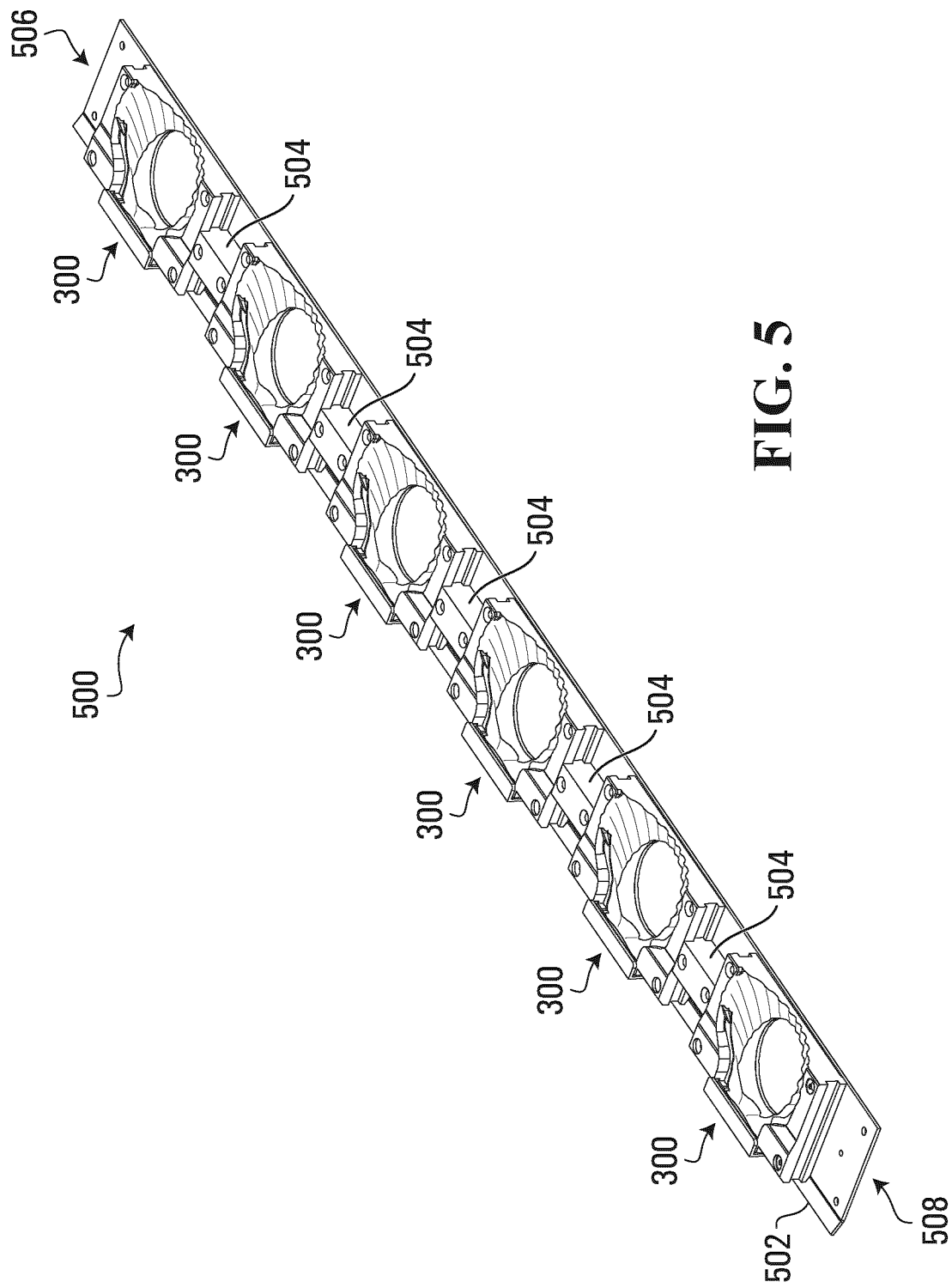
FIG. 5 is a perspective view of a row of holders including six of the holders illustrated in FIG. 3.
Figure 6:
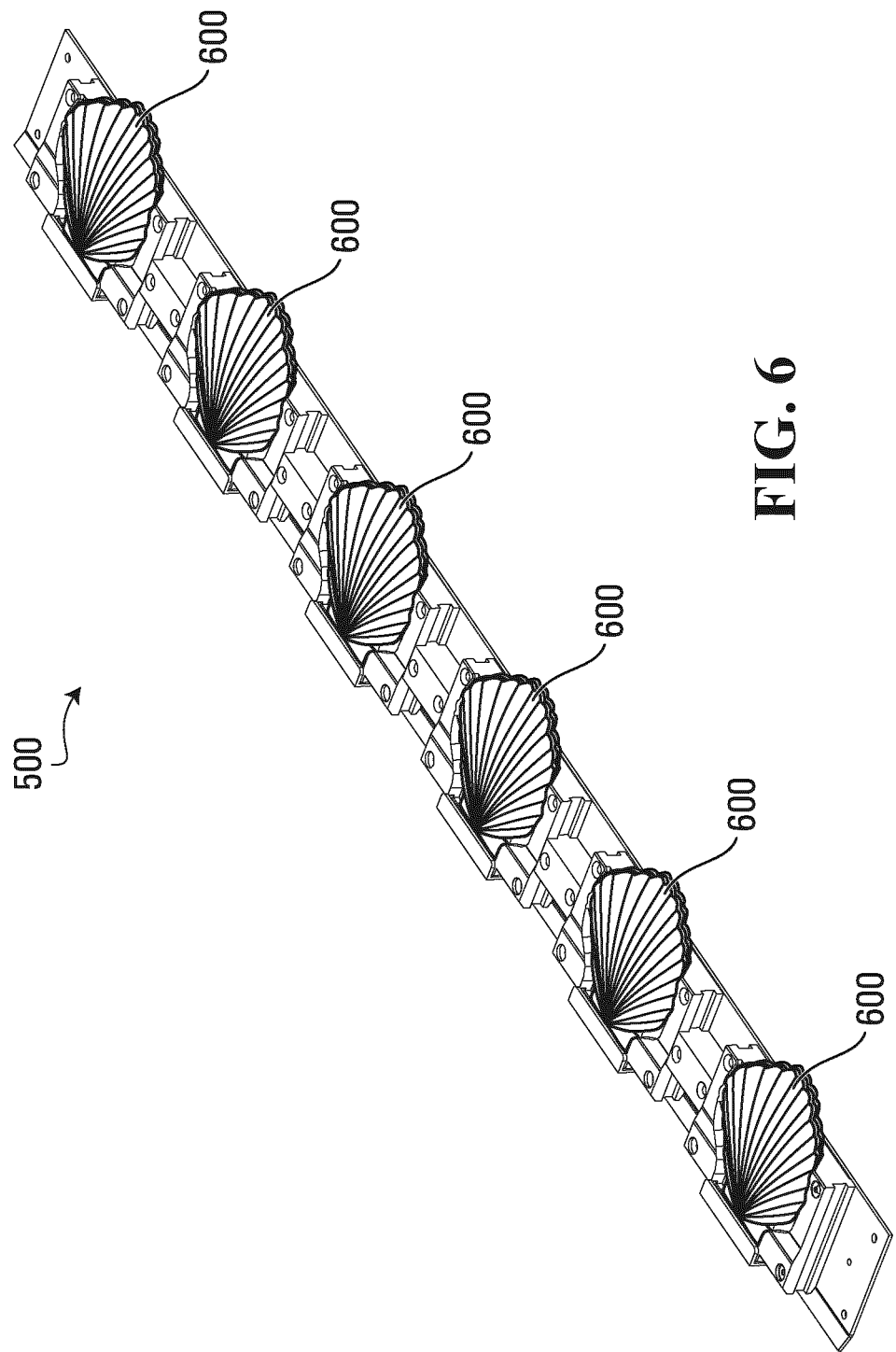
FIG. 6 is a perspective view of the row of holders illustrated in FIG. 5, with scallops loaded onto each of the holders.

Holders for scallops will now be discussed in detail with reference to FIGS. 3 to 6. FIG. 3 is a perspective view of an example holder 300 for scallops, FIG. 4 is a cross-sectional view of the holder 300, along the line A-A shown in FIG. 3, FIG. 5 is perspective view of a row 500 of holders including six of the holders 300, and FIG. 6 is a perspective view of the row 500 of holders with scallops 600 loaded onto each of the holders. As illustrated in FIGS. 3 and 4, the holder 300 includes a front 302, a back or rear 304, two sides 306, 308, a concavity 310, a bore or hole 312, a stop 314, multiple screw or bolt holes 318, and two grooves 320.

The front 302, rear 304, and sides 306, 308 are intended solely for ease of reference, and correspond to how the example holder 300 is moved through a processing machine in one particular embodiment. These references, and others herein such as "top", "bottom", etc., are not intended to infer that a holder is restricted only to a specific orientation or direction of movement.

The concavity 310 is an example of a depression or recess that is formed in a surface (illustratively a top surface) of the holder 300. The concavity 310 includes a ribbed or wave-like surface, which could also be considered a rough or textured surface. The concavity 310 extends through the front 302, but does not extend through the rear 304 or either of the sides 306, 308 in the example shown. The hole 312 is formed approximately in the center of the holder 300 and the concavity 310, and extends through the thickness of the holder 300.

The stop 314 is oriented toward the rear 304 of the holder 300. As illustrated in FIG. 4, the stop 314 includes a groove 316 that opens toward the front 302 of the holder 300, and a lip 322 that is formed by a top surface of the groove 316.

The holder 300 could be formed or fabricated in any of a number of different ways. For example, the holder 300 could be formed through molding, sintering and/or machining. The material(s) that the holder 300 could be made from is/are not limited herein, and could include any one or more of: metal(s), ceramic(s), plastic(s), rubber, and wood, for example. The holder 300 could be made from a single piece of material, or from multiple pieces of the same material or different materials that are assembled using fasteners or adhesives, for example.

In some implementations, the holder 300 is coupled to the conveyor 102 of the machine 100. The holder 300 could hold a scallop, support the scallop during processing at one or more of the stations 104, 106, 108, and/or carry the scallop between the stations. The front 302, rear 304 and sides 306, 308 of the holder 300 are defined relative to the direction of motion of the holder 300 during operation of the machine 100. The front 302 faces the direction of motion of the holder 300, the rear 304 faces away from the direction of motion of the holder, and the sides 306, 308 face a direction that is perpendicular to the direction of motion of the holder. However, the front, rear and sides of a holder could be defined differently in other implementations.

When a scallop is initially loaded on the holder 300 during operation of the machine 100, the scallop has a pair of shells, including a curved first shell and a relatively flat second shell, a hinge connecting the first shell and the second shell, and an adductor muscle and viscera attached to the shells. The holder 300 holds the scallop by the first shell, but other holders could also or instead hold a scallop by the second shell.

The concavity 310 could be sized and shaped to approximately match the size and shape of the first shell of a scallop. The area, depth and/or curvature of the concavity 310 could be based on the shape of the first shell of a typical scallop, such that the concavity closely fits, abuts and/or engages at least a portion of the shell. The area, depth and/or curvature of the concavity 310 could also or instead be designed to fit a range of different sizes and/or shapes of scallop shells. For example, the concavity 310 could be tapered to fit, abut and/or engage with at least a portion of shells that have various different sizes and/or shapes. One or more characteristics such as size and shape of a holder may be determined based at least in part on the particular species that is to be held for processing.

The ribbed surface of the concavity 310 could be provided to inhibit the scallop moving or sliding in the holder 300. The ribbed surface could engage with ribs or other features on the first shell of the scallop, to increase friction between the concavity 310 and the scallop and thereby improve resistance to movement or sliding of the scallop in the holder 300.

The stop 314 of the holder is provided to abut the hinge connecting the shells of the scallop and inhibit the scallop from sliding off the rear 304 of the holder 300. In some cases, the hinge of the scallop could at least partially enter and engage the groove 316 to inhibit motion of the scallop relative to the holder 300. The lip 322 could also limit the motion of the scallop relative to the holder 300 by, for example, abutting the top of the hinge of the scallop to inhibit the hinge from sliding or moving over the stop 314.

In some implementations, a length of the concavity 310 is less than a length of the shells of the scallop, such that a portion of the shells of the scallop extends beyond the edge at the front 302 of the holder 300. This portion of the shells could be referred to as the nose of the scallop. The length of the concavity 310 is a dimension that could be defined as the distance from the front 302 of the holder 300 to the edge of the concavity proximate the rear 304 of the holder, and the length of the shells of the scallop is a dimension that could be defined as the distance from the hinge of the scallop to the opposing tip of the shells. The portion of the shells of the scallop that extends beyond the edge of the holder 300 enables an opening to be cut into the shells at a shell cut station in some embodiments, as described in further detail elsewhere herein. The portion of the shells of a scallop extending beyond the edge at the front 302 of the holder 300 can be seen in FIG. 6.

The holder 300 is alignable with other similar or identical holders in a particular direction. An example of this is illustrated in the row 500 of FIG. 5, which includes six of the holders 300. In the row 500, the holders 300 are mounted to a mounting plate 502. The mounting plate 502 defines two sides 506, 508, and multiple holes (not shown) that align with each hole 312 of the holders 300. Bolts extend through the bolt holes 318 of each holder 300 to fasten the holder to the mounting plate 502. The row 500 also includes five connection members 504 that include protrusions to engage with the grooves 316 of adjacent holders 300 and connect the holders together.

The row 500 could form one row of holders on the conveyor 102, where each of the holders 300 in the row belongs to a respective lane 120, 122, 124, 126, 128, 130. The mounting plate 502 could be mounted to the chains 114, 116 of the conveyor 102 by the sides 506, 508. The sides 506, 508 both include multiple screw or bolt holes to receive fasteners for coupling the mounting plate 502 to the chains 114, 116, respectively.

Other arrangements for coupling holders to movement systems are also possible. Holders are coupled together in a row in the example shown in FIG. 5, and one or more such rows are coupled to a conveyor. Such row-wise coupling of holders may be useful in aligning the holders at processing stations, for example, in that an entire row is aligned by controlling movement of one conveyor. In other embodiments, lane-wise coupling is used, and holders are coupled together in lanes. Each lane is then controlled to move the holders between processing stations, and in some embodiments control of multiple lanes is coordinated so that holders are aligned and/or otherwise moved to appropriate positions for processing of a scallop in each holder.

The structure and operation of the stations 104, 106, 108, 110 in the machine 100 will now be discussed in detail.

The loading station 104 of the machine 100 is provided for loading scallops onto holders. The loading could be performed manually by one or more operators, and/or through automation. For example, a programmable mechanical arm could pick up a scallop, align the scallop with a holder, and load the scallop onto the holder. In some implementations, scallops could be loaded onto a row of holders during dwell periods in the motion of the conveyor 102. FIG. 5 illustrates the row 500 of holders before being loaded with scallops, and FIG. 6 illustrates the row of holders after being loaded with the scallops 600.

In some implementations, the machine 100 includes a scallop delivery mechanism (not shown) to automatically and/or continuously deliver scallops to the loading station. For example, a conveyor belt could carry scallops to a tray that is positioned above the conveyor 102 and proximate to the loading station 104. Operators could then retrieve the scallops from the tray and load the scallops onto holders.

Figure 7:
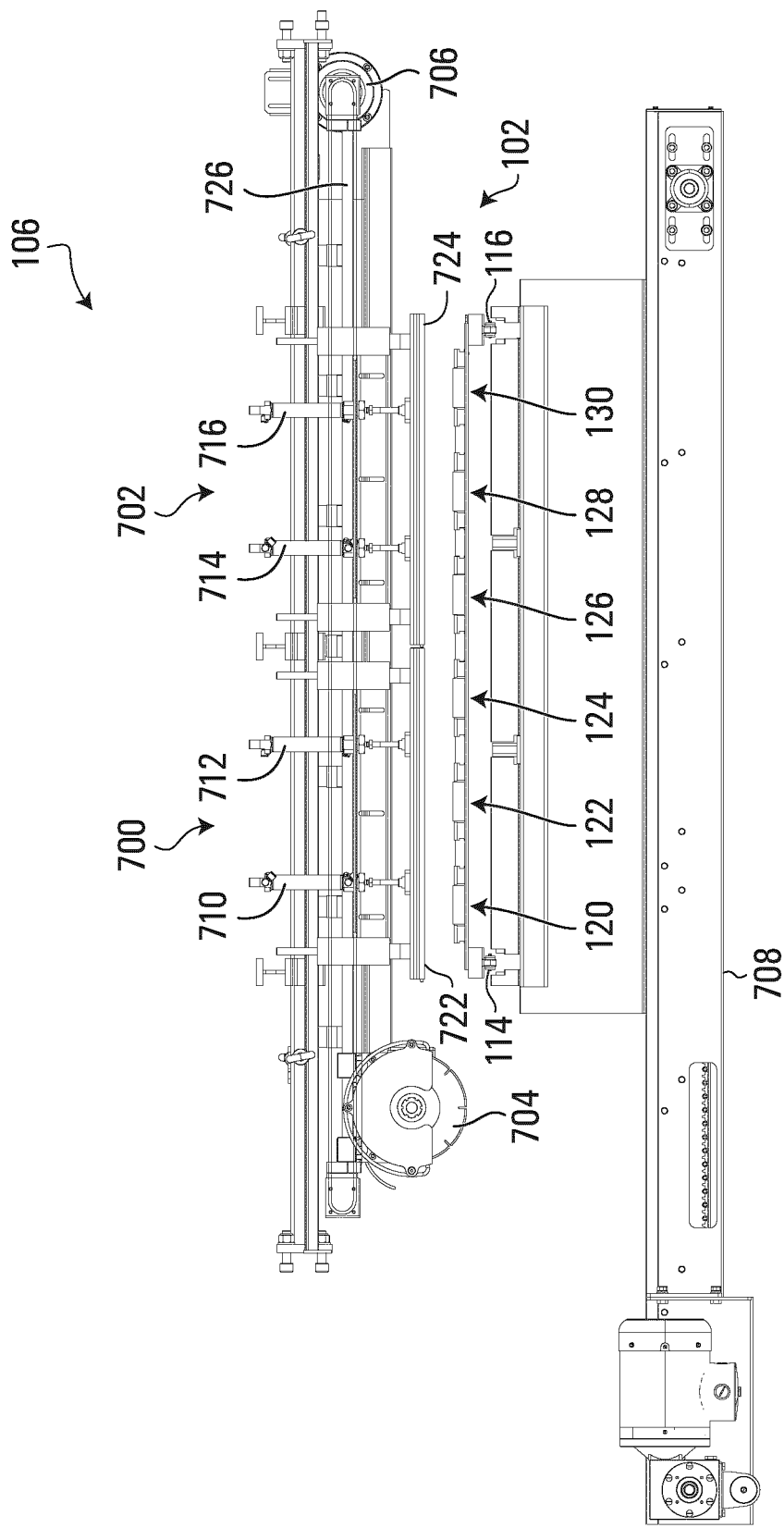
FIGS. 7 and 8 are plan views of the front of a shell cut station in the scallop processing machine shown in FIGS. 1 and 2.
Figure 8:
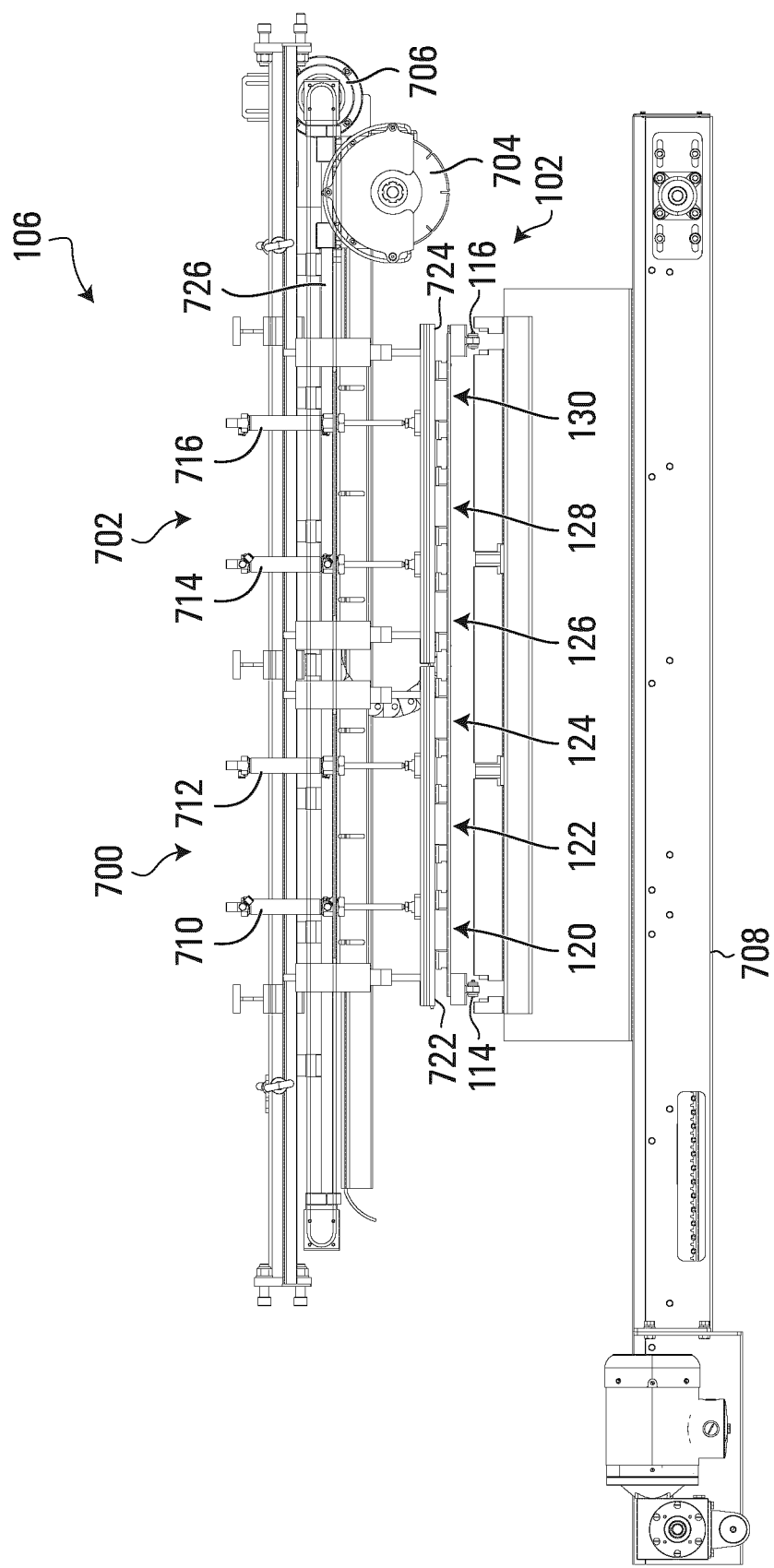
Figure 9:
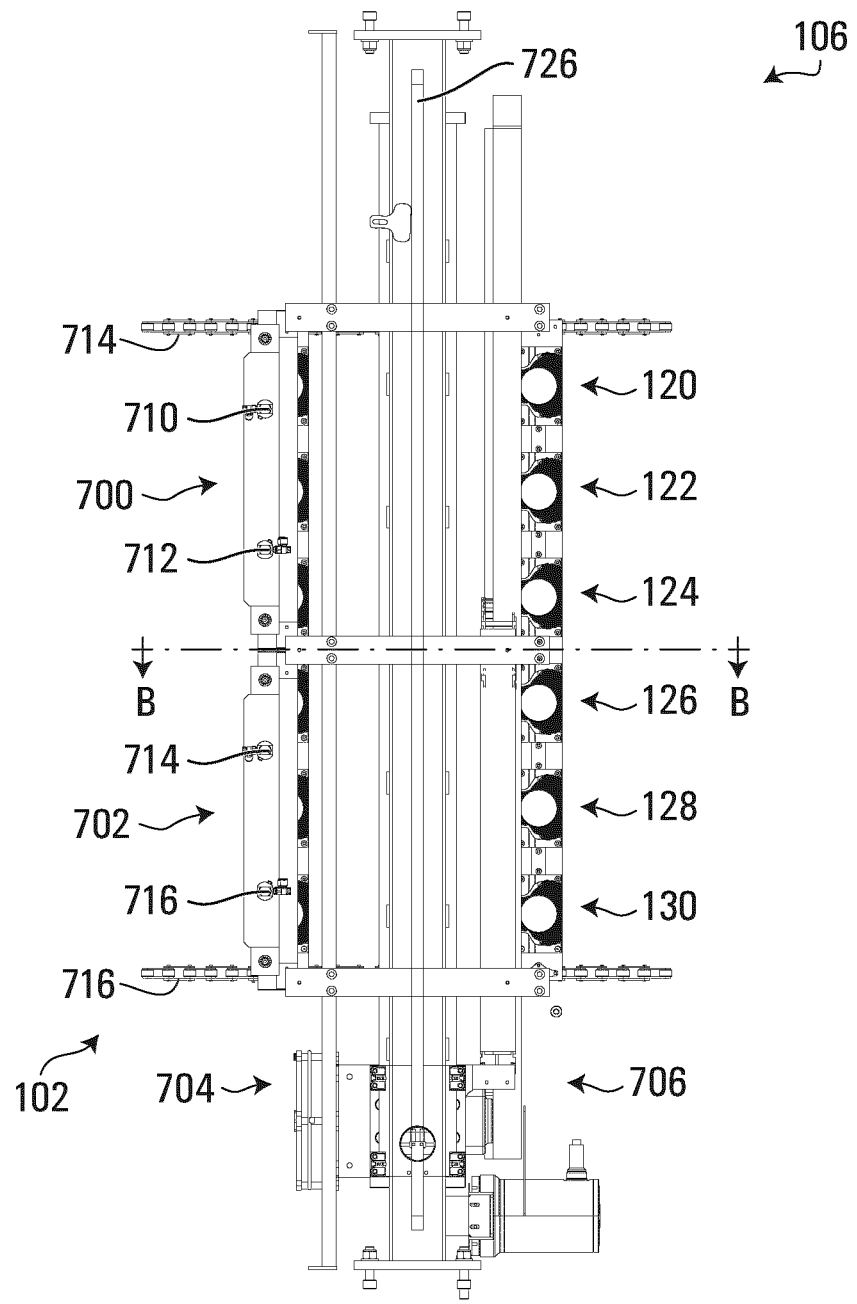
FIG. 9 is a plan view of the top of the shell cut station shown in FIG. 8.
Figure 10:
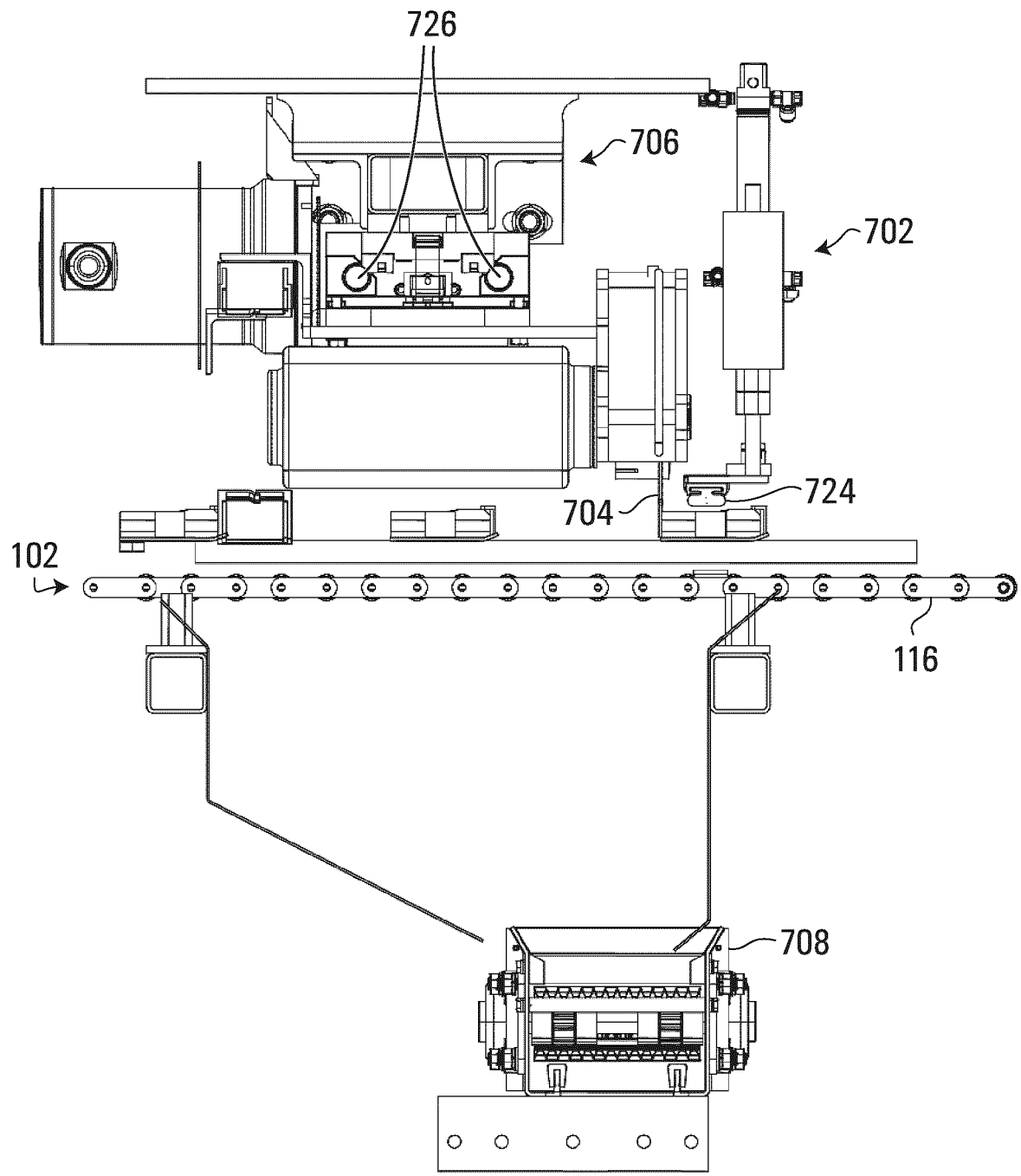
FIG. 10 is a partial cross-sectional view of the shell cut station shown in FIG. 9, along the line B-B in FIG. 9.

The shell cut station 106 in the machine 100 is provided to cut openings into the shells of scallops. FIGS. 7 and 8 are plan views of the front (relative to the motion of holders on the conveyor 102) of the shell cut station 106, FIG. 9 is a top view of the shell cut station, and FIG. 10 is a partial cross-sectional view of the shell cut station, along the line B-B in FIG. 9. In FIGS. 7 to 10, several panels and other components of the machine 100 are removed and no scallops are illustrated, so that details of the shell cut station 106 are visible.

The shell cut station 106 includes two clamping systems 700, 702, a sawblade 704, a saw actuator 706, and a waste conveyor 708 (the waste conveyor is not illustrated in FIG. 9 to avoid congestion).

Figure 11:
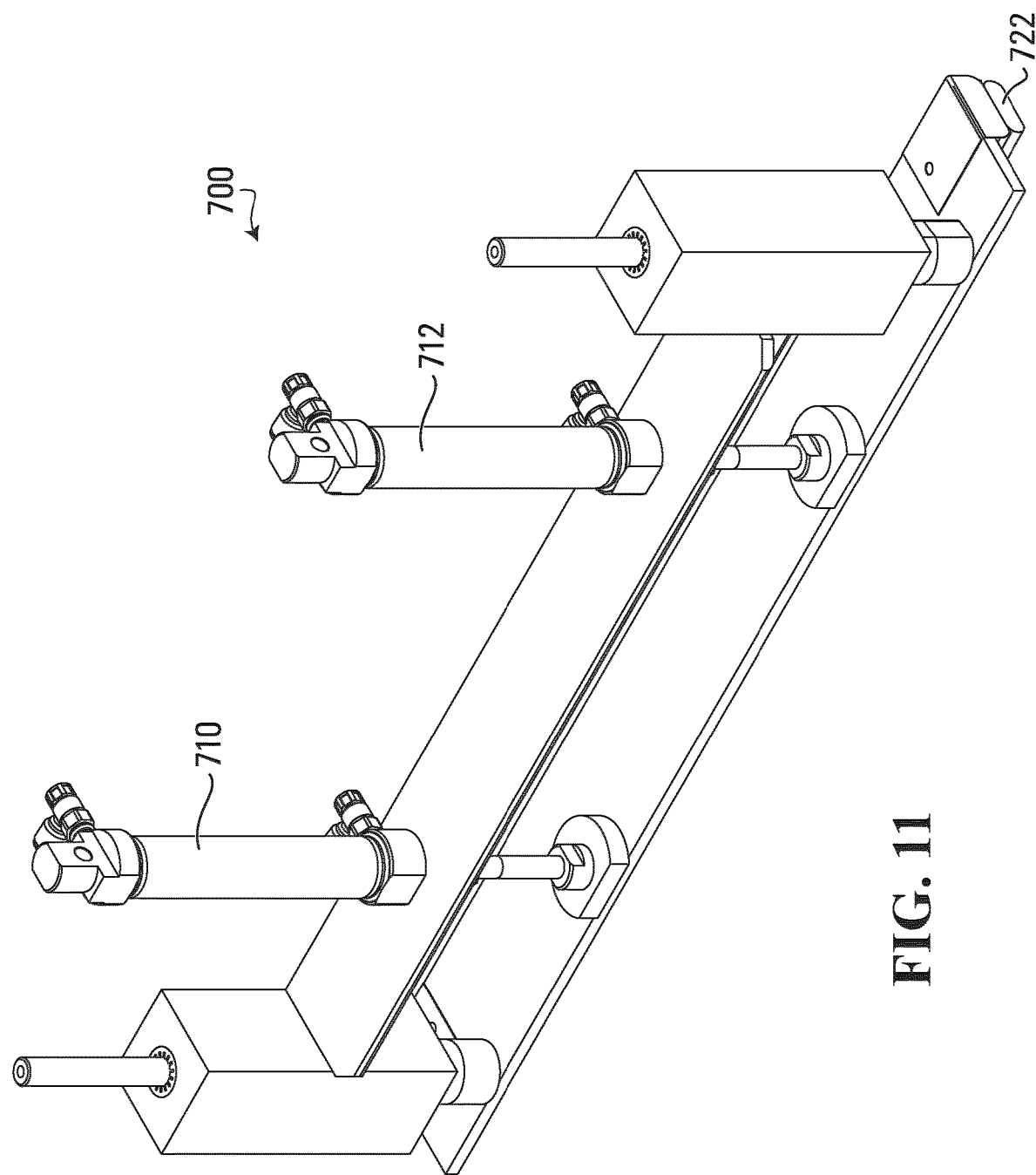
FIG. 11 is a perspective view of a clamping system in the shell cut station shown in FIGS. 7 to 10.

The clamping systems 700, 702 are provided to clamp the second shell of one or more scallops toward, and possibly against, the first shell. FIG. 11 is a perspective view of the clamping system 700 in the shell cut station 106. In FIG. 11, the clamping system 700 is illustrated apart from the rest of the shell cut station 106 for greater clarity. The clamping system 700 includes two clamping actuators 710, 712 and an inflatable bladder 722. The clamping actuators 710, 712 are coupled to the frame 112 and to the inflatable bladder 722 to support the inflatable bladder above the lanes 120, 122, 124. The clamping actuators 710, 712 include pneumatic pistons to move the inflatable bladder 722 relative to the holders in the lanes 120, 122, 124. However, in general, a clamping actuator could also or instead include any other type of actuator, such as a linear motor and a hydraulic actuator, for example, and/or more or fewer than two actuators. The inflatable bladder 722 includes a hollow, flexible material such as rubber, for example, that is filled with air or some other fluid. Although two multi-lane bladders are shown, other arrangements with fewer or more bladders, each to enable clamping in one or more lanes, are possible. In general, a clamping system may include different types and/or numbers of components than shown.

The clamping actuators 710, 712 are coupled to one or more hoses (not shown) to receive compressed air from an air compressor and/or a compressed air tank, for example. A single air compressor and/or compressed air tank could be used for each component of the machine 100 that consumes compressed air, or multiple air compressors and/or compressed air tanks could be used. Using the compressed air, the pneumatic pistons are operable to raise and/or lower the inflatable bladder 722, which moves the inflatable bladder relative to the holders in the lanes 120, 122, 124. The flow of compressed air could be controlled using one or more valves, for example.

When the clamping actuators 710, 712 are in a disengaged state, the inflatable bladder 722 is in a raised position and is separated from the holders in the lanes 120, 122, 124. In this disengaged state, the inflatable bladder 722 is not clamping any scallops. This allows the scallops and holders in the lanes 120, 122, 124 to move freely. In FIG. 7, the clamping system 700 is shown in the disengaged state, where the inflatable bladder 722 is separated from the lanes 120, 122, 124. When the clamping system 700 is engaged, the clamping actuators 710, 712 lower the inflatable bladder 722 to contact and press the inflatable bladder against the second shells of one or more scallops that are held by holders in the lanes 120, 122, 124. In FIGS. 8 to 10, the clamping system 700 is shown in the engaged state, where the clamping actuators 710, 712 have moved the inflatable bladder 722 toward the lanes 120, 122, 124.

When the inflatable bladder 722 contacts and presses against the second shell of a scallop, the inflatable bladder could deform around the shell. This could increase the surface area of the inflatable bladder 722 that is in contact with the scallop, and potentially increase clamping strength. The flexibility and/or deformability of the inflatable bladder 722 could also provide a form of self-adjustability to accommodate different sizes and/or shapes of scallop shells. The clamping actuators 710, 712, 714, 716 could also or instead provide self-adjustability, as each clamping actuator could move a different distance towards the lanes 120, 122, 124. In some implementations, a clamping actuator could move until a certain threshold of resistance is reached, and then hold at that position to perform clamping.

The inflatable bladder 722 could be inflated once and then used repeatedly thereafter. Alternatively, the inflatable bladder 722 could be actively inflated and deflated during use of the shell cut station 106. For example, the inflatable bladder 722 could be coupled to one or more hoses to receive compressed air from an air compressor or a compressed air tank. When compressed air enters the inflatable bladder, the bladder inflates and expands towards the holders in the lanes 120, 122, 124 to perform clamping.

Variations to the inflatable bladder 722 are complemented. In some embodiments, a non-inflatable component, such as one or more springs, could also or instead be used. The non-inflatable component could be made from a solid piece of rubber, foam, metal and/or plastic, for example. The non-inflatable component could be flexible or rigid.

The clamping system 702 is substantially similar to the clamping system 700 and, in some implementations, the clamping systems 700, 702 could be considered to form a single clamping system. The clamping system 702 includes two clamping actuators 714, 716 and an inflatable bladder 724. The clamping actuators 714, 716 are coupled to the frame 112 and to the inflatable bladder 724 to support the inflatable bladder above the lanes 126, 128, 130. The clamping actuators 714, 716 include pneumatic pistons to move the inflatable bladder 724 towards and away from the holders in the lanes 126, 128, 130.

In some embodiments, additional clamping systems and/or clamping components are implemented in the shell cut station 106 to further hold the first shell of a scallop. By way of example, suction grips could be provided to extend upwards through the holes in the holders of the lanes 120, 122, 124, 126, 128, 130 and to abut the first shells of scallops in the holders. Each suction grip could then form a seal against the first shell of a respective scallop and create a vacuum in the space defined by the first shell and the suction grip using a vacuum pump, for example. This creates suction that could hold the first shell of the scallop. Further details regarding a suction grip arrangement that could be used to hold the first shell of a scallop during processing are provided elsewhere herein.

Implementing multiple different forms of clamping in a scallop processing station, such as the shell cut station 106, for example, could provide improved clamping of scallops. For example, the combination of an inflatable bladder to clamp the second shell of a scallop towards the first shell and a suction grip to hold the first shell could provide an increased holding force when compared to just the inflatable bladder or just the suction grip implemented in isolation. This increased holding force could improve the stability of the scallop and better inhibit undesirable movement of the scallop during processing. Further, multiple different forms of clamping could provide a degree of redundancy in a clamping system. In an example, if a scallop is misaligned or otherwise improperly positioned in a holder, then an inflatable bladder might not correctly contact the second shell of the scallop and, as a result, inadequately clamp the scallop. Implementing a suction grip in combination with the inflatable bladder could help compensate for this inadequate clamping. The vacuum created by the suction grip could also help to realign the scallop in the holder before the inflatable bladder is engaged with the scallop, thereby potentially improving the clamping performance of the inflatable bladder.

The sawblade 704 is an example of a cutter that is operable to cut the shells of scallops. An electric motor, for example, could drive and spin the sawblade 704 in a clockwise or counter-clockwise direction during use of the shell cut station 106. A saw blade is just one example of a cutter. Other examples of cutters include drill bit-type rotary cutters, milling cutters, water jet cutters, and lasers.

The saw actuator 706 operates the sawblade 704 to cut an opening into the shells of one or more scallops. The saw actuator 706 includes a rail 726 that is coupled to and supports the sawblade 704 on the frame 112. To cut the opening, the saw actuator 706 moves the sawblade 704 along the rail 726 in a direction that is perpendicular to the direction of motion of the conveyor 102. The saw actuator 706 includes a belt or chain that is coupled to the sawblade 704 to move sawblade along the rail 726. The belt or chain could be driven by an electric motor or some other kind of motor, for example. The saw actuator 706 moves the sawblade 704 linearly between a first position and a second position, which are located on opposing sides of the conveyor 102 and in a direction of alignment of the holders in the example shown. The first position of the sawblade 704 is proximate the chain 114, and the second position of the sawblade is proximate the chain 116. FIG. 7 illustrates the sawblade 704 in the first position, and FIGS. 8 to 10 illustrate the sawblade in the second positon.

It should be noted that the saw actuator 706 is only one example of an actuator to operate or move the sawblade 704. In other implementations, a saw actuator could also or instead include linear motors, hydraulic actuators, and pneumatic actuators. Other directions of motion of a cutter are also possible. A cutter need not necessarily be moved in an alignment direction of multiple holders. For example, in other embodiments a cutter may be moved in a direction perpendicular to the alignment direction.

The waste conveyor 708 is disposed below the sawblade 704 and saw actuator 706 to collect and transport cut portions of scallop shells away from the shell cut station 106. However, a waste conveyor might not be implemented in all shell cut stations. For example, a container could instead be implemented below the sawblade 704 and saw actuator 706 to collect cut portions of scallop shells. The container could be periodically emptied of shells to avoid overflow.

When the machine 100 is in use, the conveyor 102 carries rows of holders loaded with scallops to the shell cut station 106. During a movement period of the conveyor 102, a row of holders is moved into alignment with the sawblade 704 and the clamping systems 700, 702. The clamping systems 700, 702 are disengaged during this movement period. The row of holders is held in alignment with the sawblade 704 and the clamping systems 700, 702 during a subsequent dwell period of the conveyor 102. The holders in the lanes 120, 122, 124 are positioned below the inflatable bladder 722, and the holders in the lanes 126, 128, 130 are positioned below the inflatable bladder 724. The row of holders is also positioned such that the sawblade 704 is aligned with a portion of the shells of each scallop that extends beyond an edge at the front of the holder for the scallop. An example configuration of the shell cut station 106 immediately after a movement period of the conveyor 102 is illustrated in FIG. 7.

During the dwell period of the conveyor 102, and/or responsive to alignment of the row of holders with the sawblade 704, the clamping systems 700, 702 are engaged to clamp each scallop in the row of holders. To engage the clamping systems 700, 702, the clamping actuators 710, 712, 714, 716 lower the inflatable bladders 722, 724 toward the row of holders. As a result, the inflatable bladders 722, 724 abut the second shell of each scallop in the row of holders to clamp, hold, push or otherwise force the second shell of each scallop toward, and possibly into contact with, the first shell. This also clamps, pushes or forces the first shell of each scallop against the holder that holds that scallop. In some embodiments, the inflatable bladders 722, 724 could also or instead be inflated to clamp the scallops. The engagement of the clamping systems 700, 702 inhibits the scallops from moving relative to the holders during shell cutting. An example configuration of the shell cut station 106 after the clamping systems 700, 702 have been engaged is illustrated in FIGS. 8 to 10.

During the same dwell period of the conveyor 102, the saw actuator 706 actuates or operates the sawblade 704 to linearly cut an opening into the shells of scallops held by the row of holders. This operation by the saw actuator 706 could be responsive to alignment of the row of holders with the sawblade 704 and/or responsive to clamping by the clamping systems 700, 702. Specifically, the saw actuator 706 could move the sawblade 704 along the rail 726 from the first position shown in FIG. 7 to the second position shown in FIGS. 8 to 10, or vice versa. The motion of the sawblade 704 brings the sawblade into contact with the portion of the shells of each scallop that extends beyond an edge of a holder, and an opening is cut into this portion of the shells of the scallop. This arrangement, with the shells extending beyond the edge of a holder, may be beneficial in avoiding or at least reducing the risk of damage to holders during shell cutting and/or allowing cut portions of shells to freely fall away from the holders.

The opening is cut into the end of the shells or "nose" of a scallop that is substantially opposite the hinge of the scallop. The shells of multiple scallops can be cut during a single movement of the sawblade 704 by the saw actuator 706. The portions of the shells that are cut could fall into the waste conveyor 708 and be removed from the shell cut station 106. In some implementations, the sawblade 704 is continuously spinning while the machine 100 is operating, and therefore the sawblade 704 does not need to be activated before operation by the saw actuator 706. In other implementations, the spinning of the sawblade 704 stops or slows between cuts, and therefore the sawblade 704 may be activated before operation by the saw actuator 706.

Following the operation of the sawblade 704 to cut the opening into the shells of the scallops, the sawblade is held at its end position (either the first position or the second position) and the clamping systems 700, 702 disengage. To disengage the clamping systems 700, 702, the inflatable bladders 722, 724 could be moved away from the holders to the configuration shown in FIG. 7 to release the second shells of the scallops. The inflatable bladders 722, 724 could also or instead be deflated to disengage from the scallops and holders. The row of holders holding the scallops are then moved out of alignment with the clamping systems 700, 702 and the sawblade 704 in a subsequent movement period of the conveyor 102.

Figure 12:
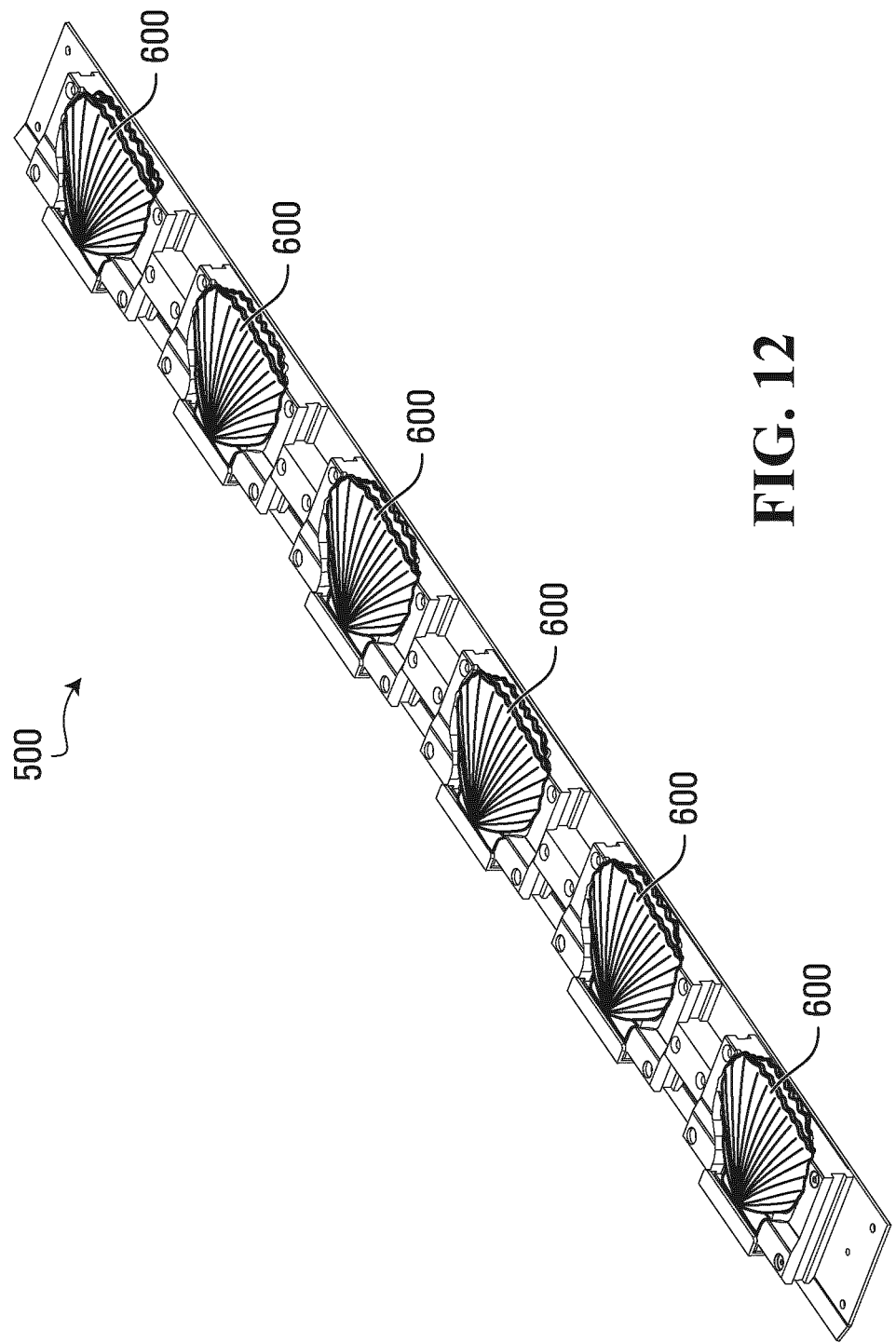
FIG. 12 is a perspective view of the row of holders illustrated in FIG. 6, with openings cut into the shells of the scallops.

An example of a row of holders holding scallops that have been processed in the shell cut station 106 is shown in FIG. 12. FIG. 12 is a perspective view of the row 500 of holders illustrated in FIG. 6, with openings cut into the shells of the scallops 600.

Figure 13:
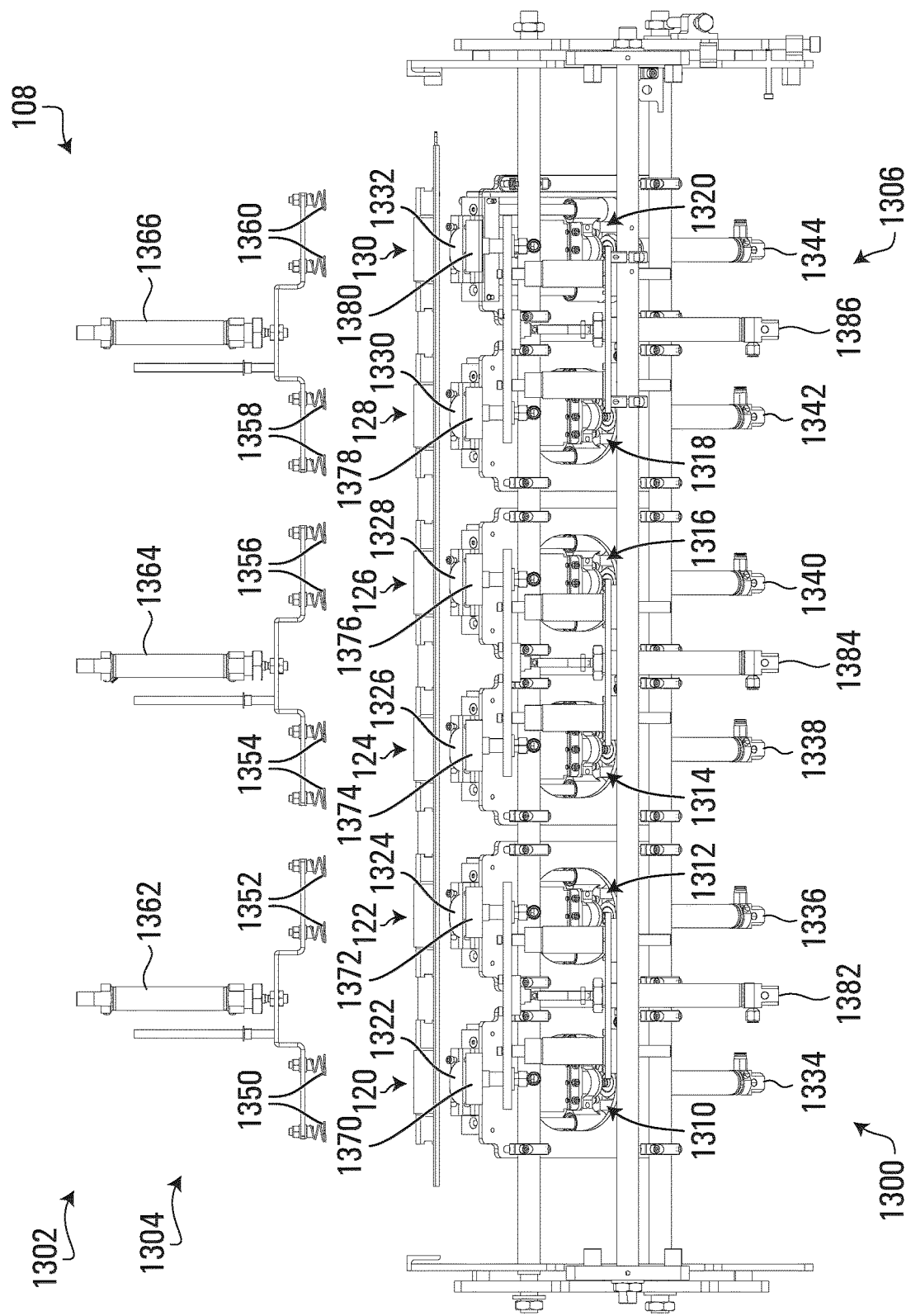
FIGS. 13 and 14 are plan views of the front of a muscle cut station in the scallop processing machine shown in FIGS. 1 and 2.
Figure 14:
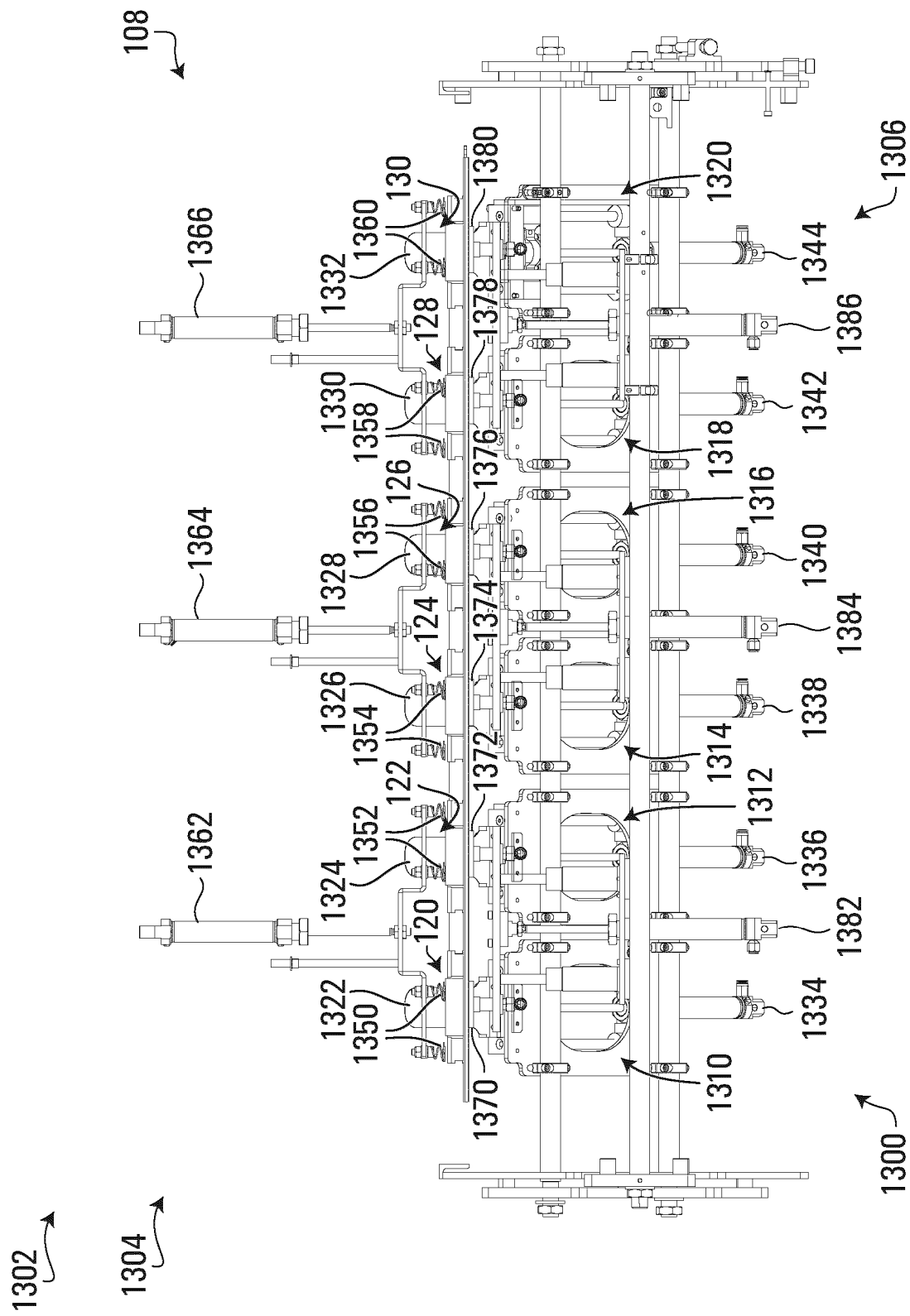
Figure 15:
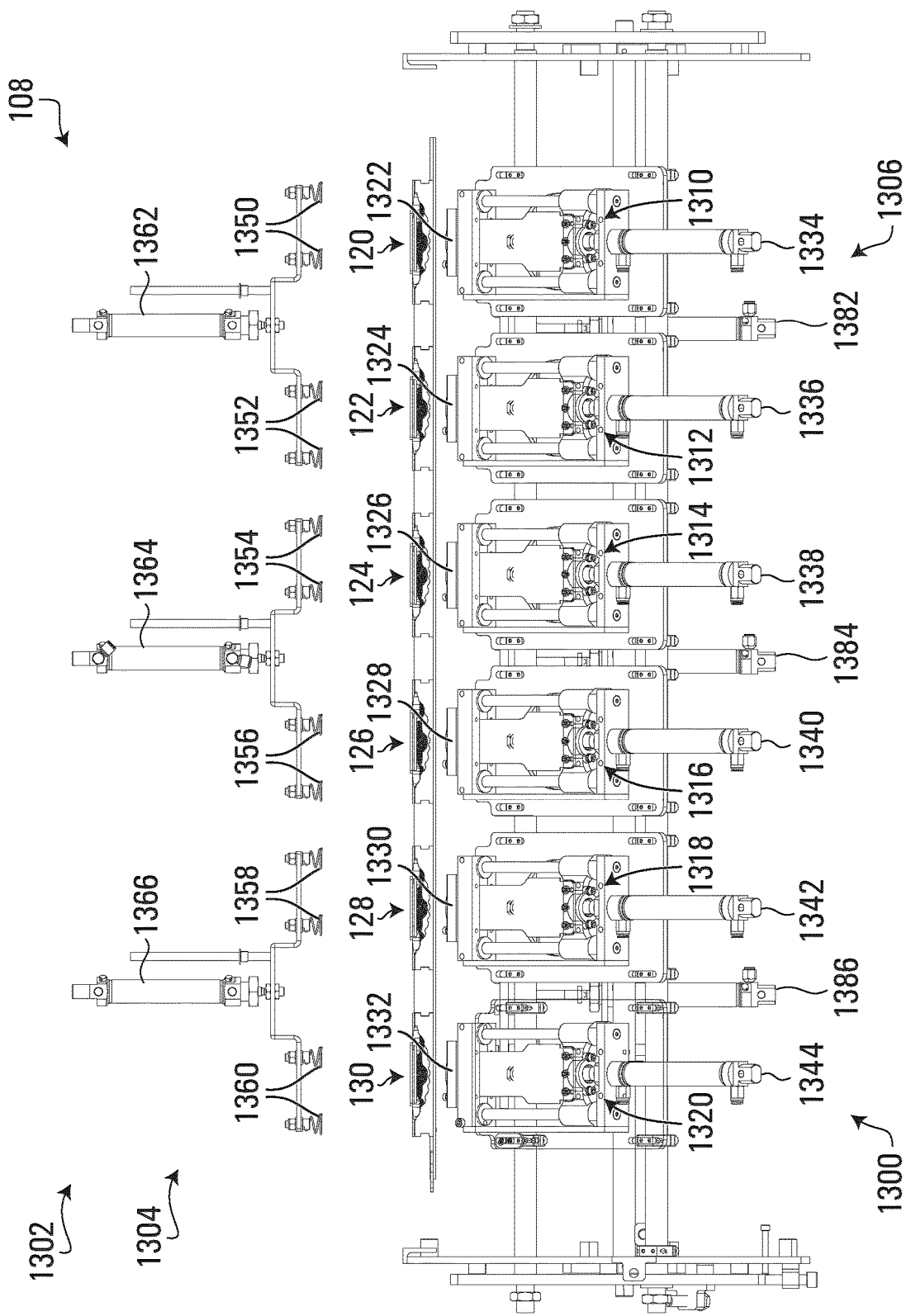
FIGS. 15 and 16 are plan views of the back of the muscle cut station shown in FIGS. 13 and 14, respectively.
Figure 16:
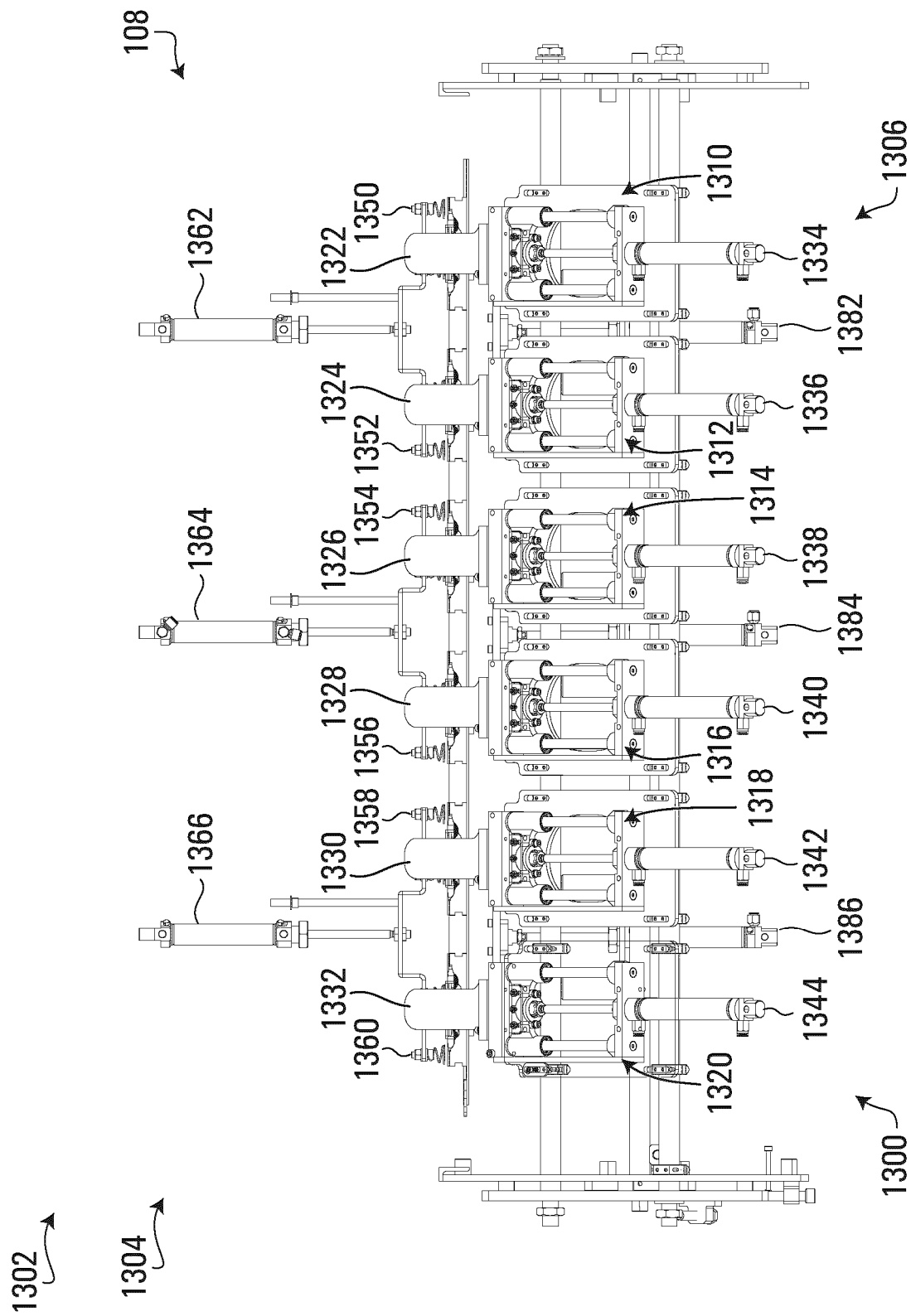
Figure 17:
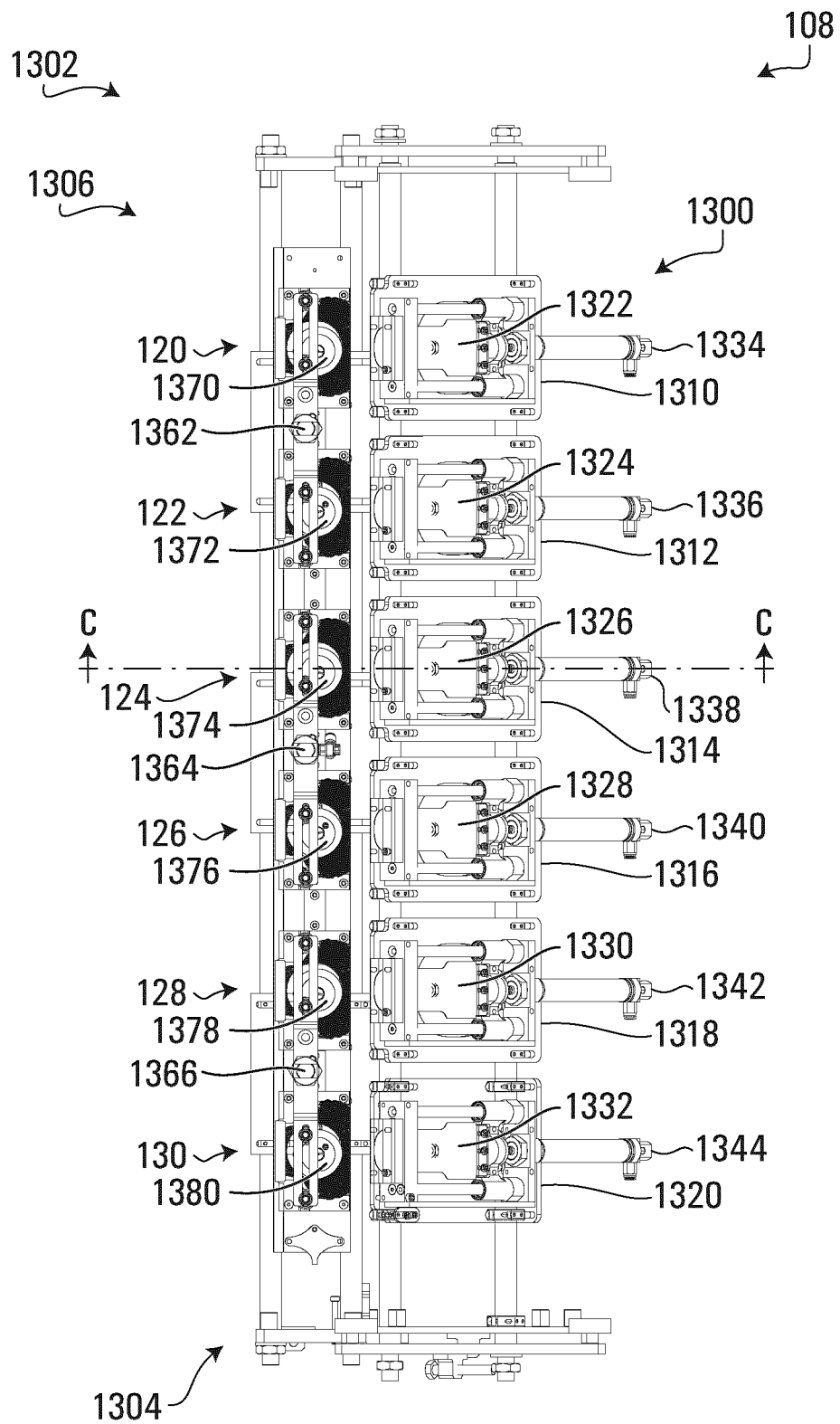
FIGS. 17 and 18 are plan views of the top of the muscle cut station shown in FIGS. 13 and 14, respectively.
Figure 18:
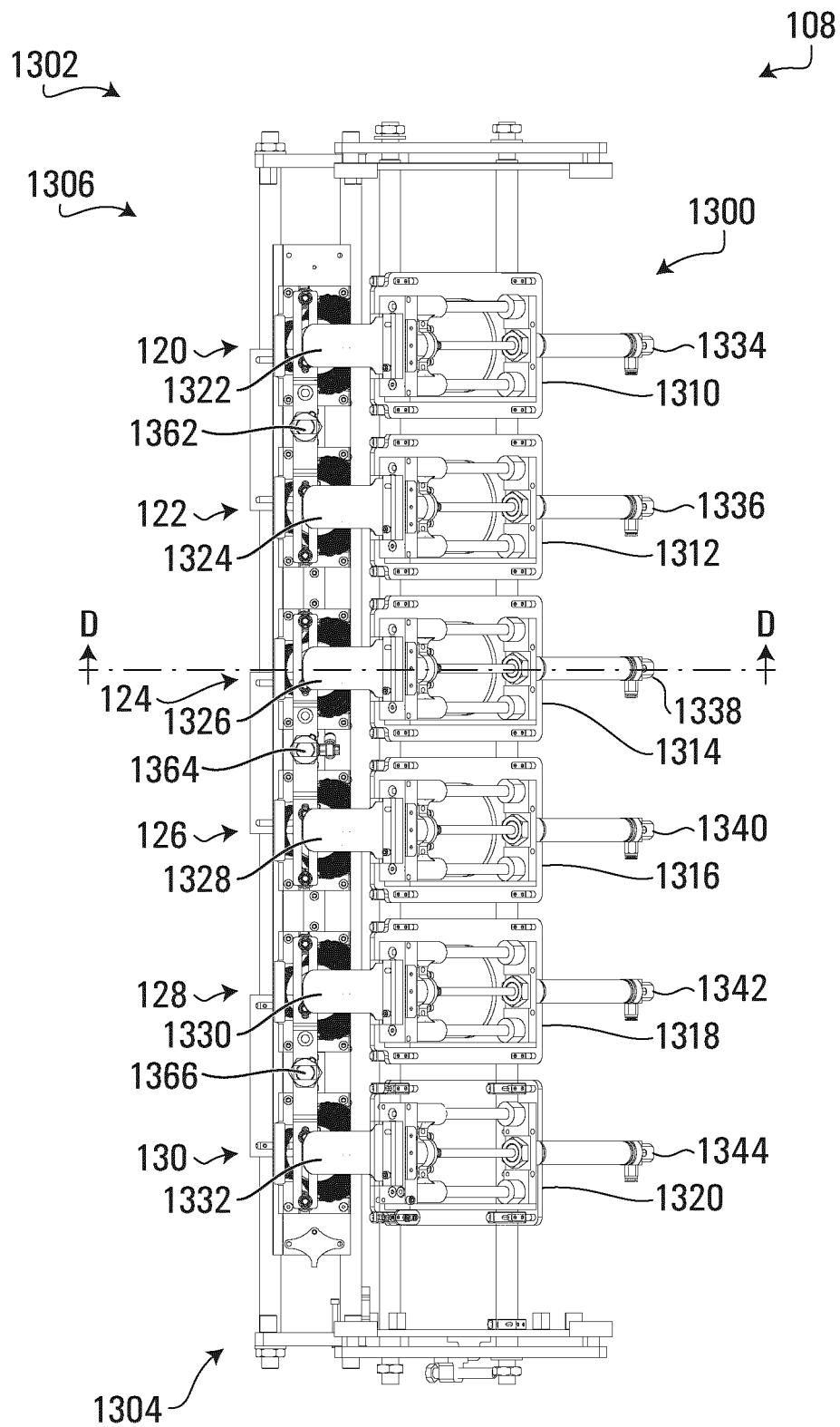
Figure 19:
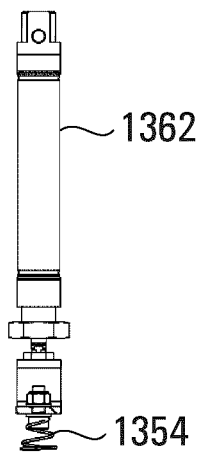
FIG. 19 is a cross-sectional view of the muscle cut station shown in FIG. 17, along the line C-C in FIG. 17.
Figure 19:
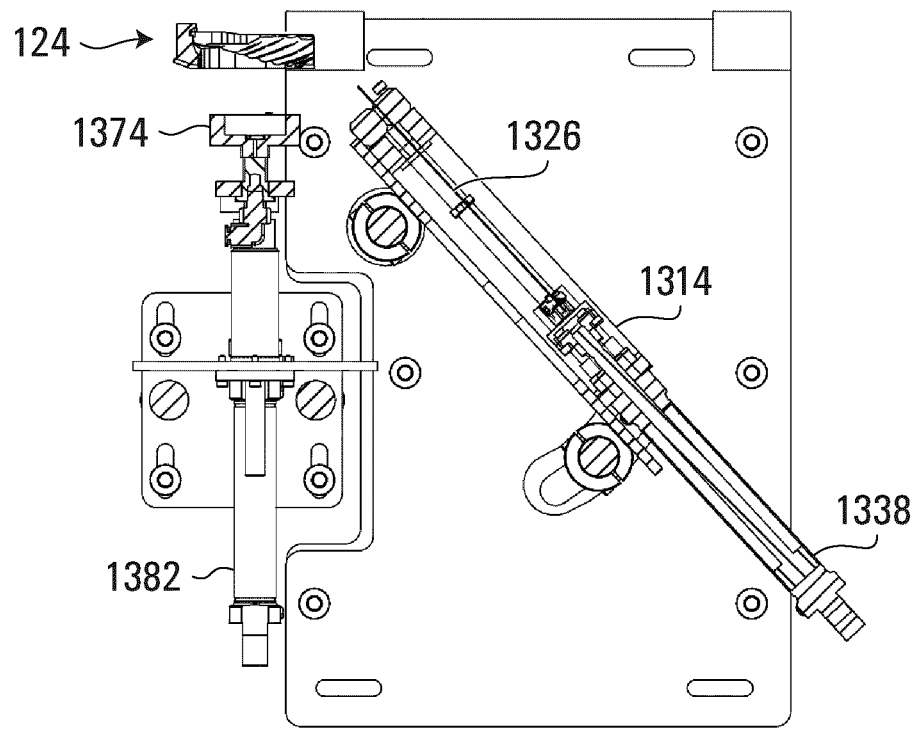
Figure 20:
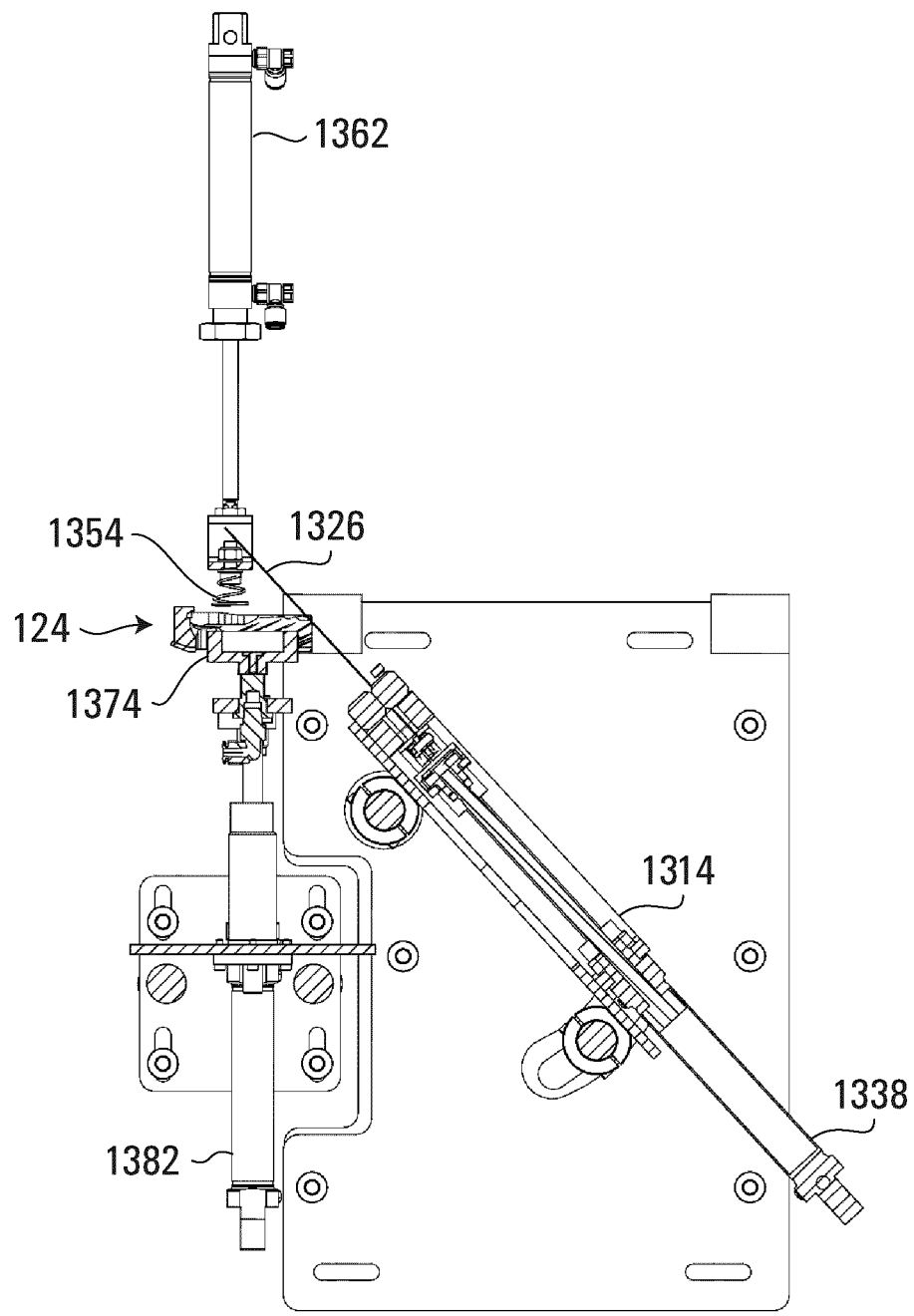
FIG. 20 is a cross-sectional view of the muscle cut station shown in FIG. 18, along the line D-D in FIG. 18.

The muscle cut station 108 of the machine 100 is provided to cut the adductor muscle from the second shell of a scallop through an opening in the shells of the scallop. FIGS. 13 and 14 are plan views of the front (relative to the motion of holders on the conveyor 102) of the muscle cut station 108, FIGS. 15 and 16 are plan views of the back (relative to the motion of holders on the conveyor) of the muscle cut station, FIGS. 17 and 18 are plan views of the top of the muscle cut station, FIG. 19 is a cross-sectional view of the muscle cut station, along the line C-C in FIG. 17, and FIG. 20 is a cross-sectional view of the muscle cut station, along the line D-D in FIG. 18. In FIGS. 13 to 20, several panels and other components of the machine 100 are removed and no scallops are illustrated, so that the details of the muscle cut station 108 are visible.

Figure 21:
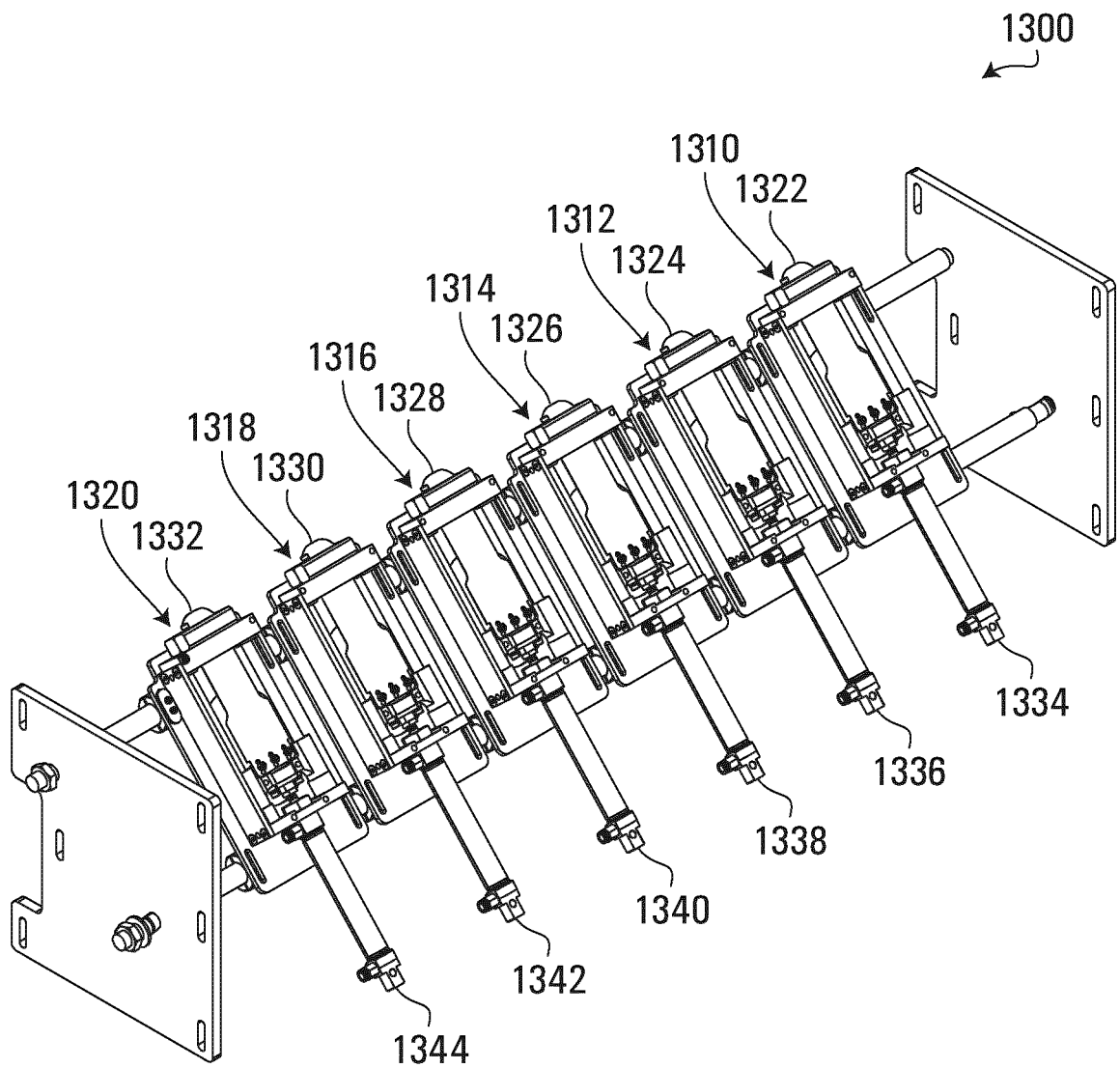
FIG. 21 is a perspective view of a cutting system in the muscle cut station shown in FIGS. 13 to 20.

The muscle cut station 108 includes a cutting system 1300 and a clamping system 1302. FIG. 21 is a perspective view of the cutting system 1300. In FIG. 21, the cutting system 1300 is illustrated apart from the rest of the muscle cut station 108 for greater clarity. The cutting system 1300 includes multiple cutters 1310, 1312, 1314, 1316, 1318, 1320 to cut the adductor muscle from the second shells of scallops through an opening between their shells. These openings could have been cut by the shell cut station 106, for example. Each of the cutters 1310, 1312, 1314, 1316, 1318, 1320 is aligned with one of the lanes 120, 122, 124, 126, 128, 130 to cut the adductor muscle of the scallops in that lane. The cutters 1310, 1312, 1314, 1316, 1318, 1320 are positioned below the lanes 120, 122, 124, 126, 128, 130, and are oriented at an upwards angle towards the lanes. The angle of the cutters 1310, 1312, 1314, 1316, 1318, 1320 is oblique relative to the motion of the holders on the conveyor 102. This orientation of the cutters 1310, 1312, 1314, 1316, 1318, 1320 is perhaps best illustrated in FIGS. 19 and 20.

The cutters 1310, 1312, 1314, 1316, 1318, 1320 each include a respective cutting blade 1322, 1324, 1326, 1328, 1330, 1332 and a respective cutting actuator 1334, 1336, 1338, 1340, 1342, 1344. The cutting blades 1322, 1324, 1326, 1328, 1330, 1332 are tongue-shaped knives that could include sharpened edges. In an embodiment, the cutting blades 1322, 1324, 1326, 1328, 1330, 1332 are sized and shaped to pass through the openings in the shells of scallops and scrape against the inside surface of the second shell to cut the adductor muscle. For example, the width of the cutting blades 1322, 1324, 1326, 1328, 1330, 1332 could be less than the width of the openings cut into the shells of scallops at the shell cut station 106. The length of the cutting blades 1322, 1324, 1326, 1328, 1330, 1332 could be selected to allow the cutting blade to reach the adductor muscle. In some implementations, the cutting blades 1322, 1324, 1326, 1328, 1330, 1332 are flexible and could be made out of metal and/or plastic, for example.

The cutting actuators 1334, 1336, 1338, 1340, 1342, 1344 are coupled to the cutting blades 1322, 1324, 1326, 1328, 1330, 1332, and move the cutting blades relative to the holders in the lanes 120, 122, 124, 126, 128, 130. The cutting actuators 1334, 1336, 1338, 1340, 1342, 1344 each include a pneumatic piston, and are coupled to one or more hoses (not shown) to receive compressed air from an air compressor and/or a compressed air tank, for example. Using the compressed air, the pneumatic pistons are operable to move the cutting blades 1322, 1324, 1326, 1328, 1330, 1332 towards and away from the lanes 120, 122, 124, 126, 128, 130. The compressed air could be controlled using one or more valves, for example. In some implementations, cutting actuators also or instead include other types of actuators, such as linear motors and hydraulic actuators, for example.

The cutting actuators 1334, 1336, 1338, 1340, 1342, 1344 each further include a guide arrangement to control the motion of the cutting blades 1322, 1324, 1326, 1328, 1330, 1332. An example of a guide arrangement includes roller bearings on either side of a cutting blade to guide the motion of the cutting blade. In some implementations, a guide arrangement is adjustable, and possibly self-adjustable, to direct a cutting blade in different directions. This adjustability could accommodate different sizes and shapes of scallops, as well as different positions of openings in the shells of scallops, for example.

Other examples of cutters for use in a muscle cut station are contemplated. For example, water jet cutters could be implemented to spray a jet of water through an opening in the shells of a scallop to cut the adductor muscle from the second shell.

Figure 22:
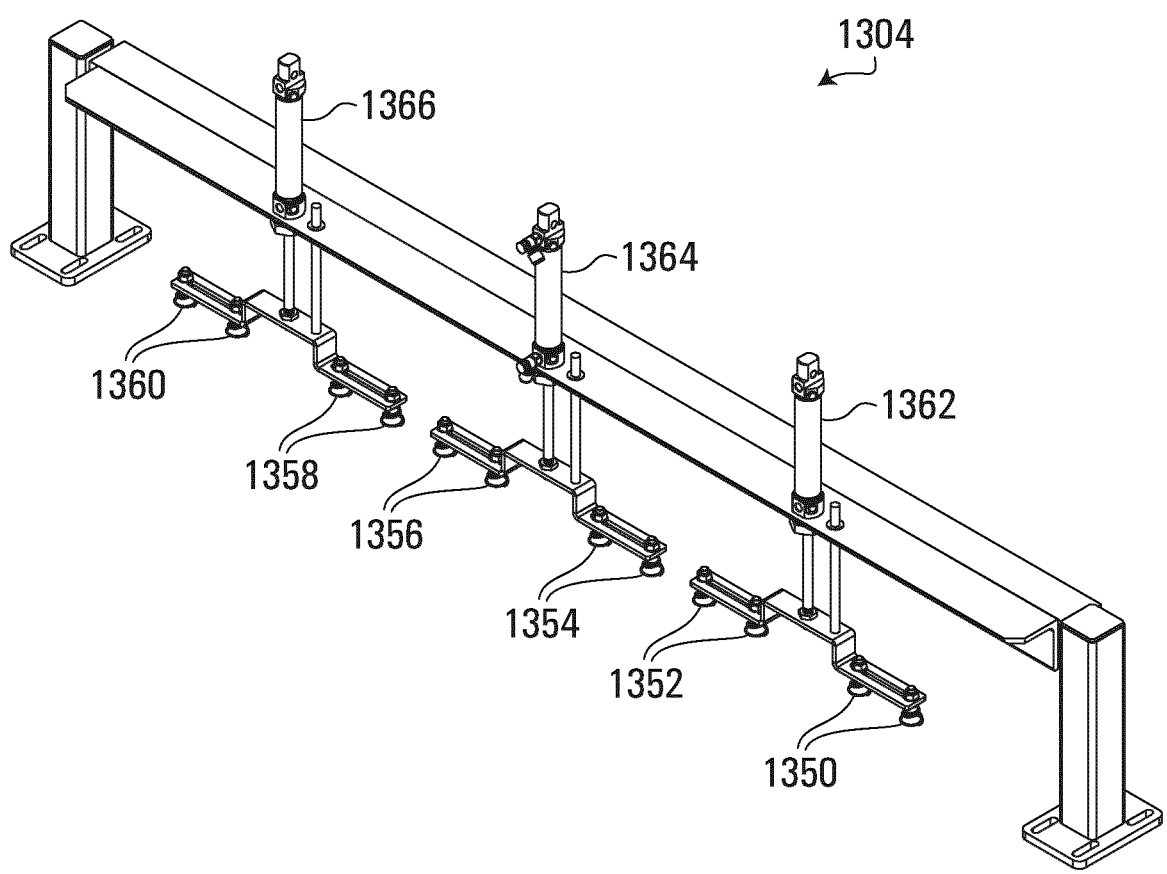
FIG. 22 is a perspective view of a spring arrangement in the muscle cut station shown in FIGS. 13 to 20.

The clamping system 1302 is provided to clamp the second shell of one or more scallops toward, and possibly into contact with, the first shell. The clamping system 1302 includes a spring arrangement 1304 and a suction grip arrangement 1306. FIG. 22 is a perspective view of the spring arrangement 1304. In FIG. 22, the spring arrangement 1304 is illustrated apart from the rest of the muscle cut station 108 for greater clarity. The spring arrangement 1304 includes multiple pairs of springs 1350, 1352, 1354, 1356, 1358, 1360 and multiple clamping actuators 1362, 1364, 1366. The springs 1350, 1352, 1354, 1356, 1358, 1360 could be made from a resilient material such as metal, for example. The clamping actuator 1362 is coupled to the frame 112 and to the springs 1350, 1352 to align these springs above the lanes 120, 122. Similarly, the clamping actuator 1364 is coupled to the frame 112 and to the springs 1354, 1356 to align these springs above the lanes 124, 126, and the clamping actuator 1366 is coupled to the frame 112 and to the springs 1358, 1360 to align these springs above the lanes 128, 130. The springs 1350, 1352, 1354, 1356, 1358, 1360 could be pivotally coupled to the clamping actuators 1362, 1364, 1366. For example, the springs 1350, 1352 could pivot about the connection to the clamping actuator 1362, and therefore the springs 1350 could be at a different height than the springs 1352 relative to the conveyor 102.

The clamping actuators 1362, 1364, 1366 are provided to move the springs 1350, 1352, 1354, 1356, 1358, 1360 relative to the holders in the lanes 120, 122, 124, 126, 128, 130. The clamping actuators 1362, 1364, 1366 could be similar to the clamping actuators 710, 712, for example.

Each of the clamping actuators 1362, 1364, 1366 includes a pneumatic piston to move the springs 1350, 1352, 1354, 1356, 1358, 1360 between a disengaged state and an engaged state of the spring arrangement 1304. In the disengaged state, the springs 1350, 1352, 1354, 1356, 1358, 1360 are separated from the holders in the lanes 120, 122, 124, 126, 128, 130 and any scallops in those holders. The disengaged state of the spring arrangement 1304 is illustrated in FIGS. 13, 15, 17 and 19. In the engaged state, the springs 1350, 1352, 1354, 1356, 1358, 1360 could contact and press against the second shells of scallops that are held by a row of holders. This clamps the second shells of the scallops towards their first shells, and inhibits movement of the scallops in the holders.

The springs 1350, 1352, 1354, 1356, 1358, 1360 could be compressed as a result of the clamping. The flexibility and deformability of the springs 1350, 1352, 1354, 1356, 1358, 1360 could provide a form of self-adjustability to accommodate different sizes and/or shapes of scallop shells. The clamping actuators 1362, 1364, 1366 could also or instead provide a form of self-adjustability, as each clamping actuator could move a different distance toward the holders in the lanes 120, 122, 124, 126, 128, 130. Furthermore, pivotal connections between the springs 1350, 1352, 1354, 1356, 1358, 1360 and the clamping actuators 1362, 1364, 1366 could allow the springs to self-adjust to different shapes and sizes of scallops. The engaged state of the spring arrangement 1304 is illustrated in FIGS. 14, 16, 18 and 20.

As noted elsewhere herein, a clamping system may include different types and/or numbers of components than shown. For example, there may be more or fewer actuators and/or springs in other embodiments.

Figure 23:
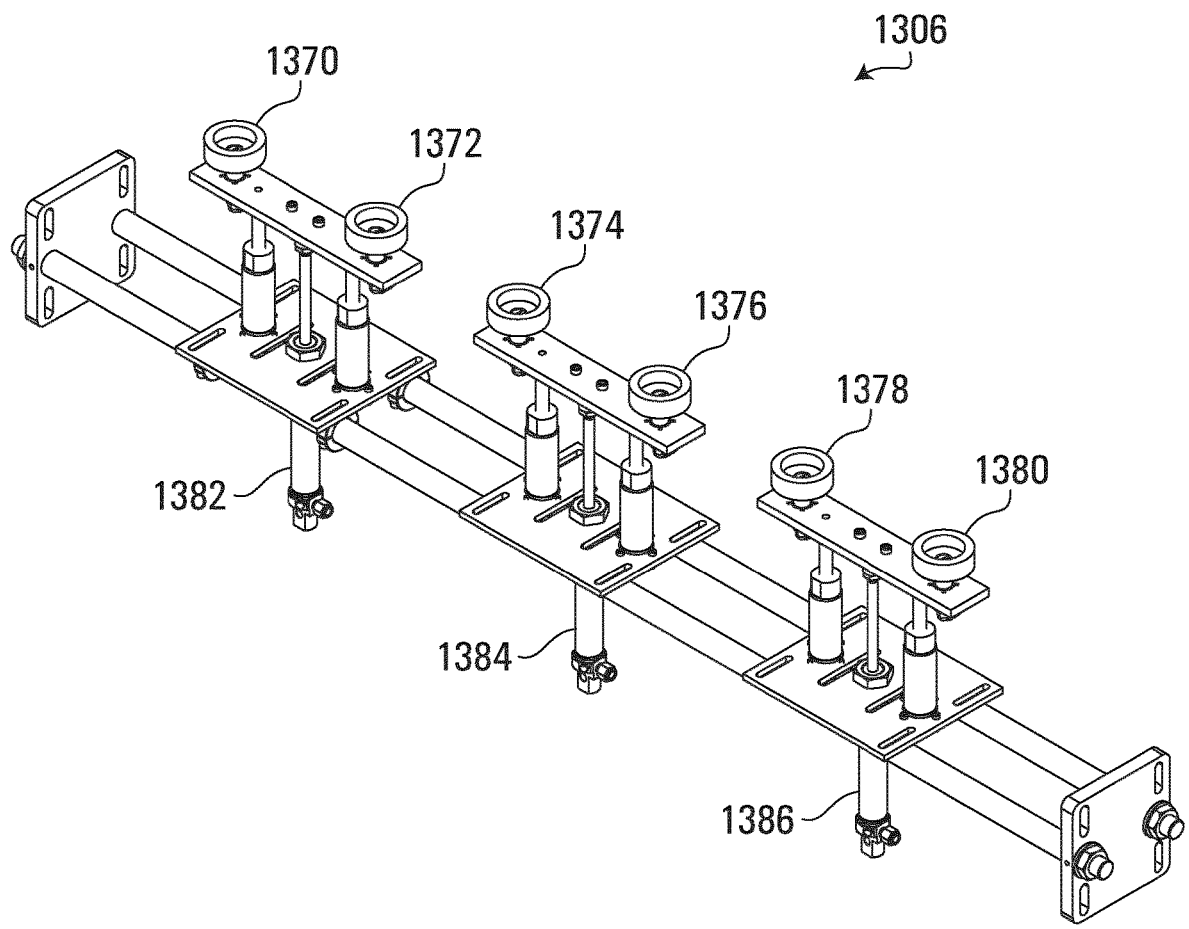
FIG. 23 is a perspective view of a suction grip arrangement in the muscle cut station shown in FIGS. 13 to 20.

FIG. 23 is a perspective view of the suction grip arrangement 1306. In FIG. 23, the suction grip arrangement 1306 is illustrated apart from the rest of the muscle cut station 108 for greater clarity. The suction grip arrangement 1306 includes multiple suction grips 1370, 1372, 1374, 1376, 1378, 1380 and multiple clamping actuators 1382, 1384, 1386. The clamping actuator 1382 is coupled to the frame 112 and to the suction grips 1370, 1372 to align these suction grips below the lanes 120, 122. Similarly, the clamping actuator 1384 is coupled to the frame 112 and to the suction grips 1374, 1376 to align these suction grips below the lanes 124, 126, and the clamping actuator 1386 is coupled to the frame 112 and the suction grips 1378, 1380 to align these suction grips below the lanes 128, 130. In other embodiments, a suction grip arrangement may include different types and/or numbers of actuators and/or suction grips than shown.

The clamping actuators 1382, 1384, 1386 move the suction grips 1370, 1372, 1374, 1376, 1378, 1380 relative to the holders in the lanes 120, 122, 124, 126, 128, 130. The clamping actuators 1382, 1384, 1386 could be similar to the clamping actuators 710, 712, for example. The clamping actuators 1362, 1364, 1366 each include a pneumatic piston in the example shown, to move the suction grips 1370, 1372, 1374, 1376, 1378, 1380 between a disengaged state and an engaged state of the suction grip arrangement 1306. In the disengaged state, the suction grips 1370, 1372, 1374, 1376, 1378, 1380 are separated from the holders in the lanes 120, 122, 124, 126, 128, 130 and any scallops therein. The disengaged state of the suction grip arrangement 1306 is illustrated in FIGS. 13, 15, 17 and 19, and is perhaps best seen in FIG. 19. In the engaged state, the suction grips 1370, 1372, 1374, 1376, 1378, 1380 extend through holes in the holders of lanes 120, 122, 124, 126, 128, 130. These holes could be similar to the hole 312 of the holder 300.

When a suction grip extends through a hole of a holder, the suction grip could abut the first shell of a scallop in that holder. The suction grips 1370, 1372, 1374, 1376, 1378, 1380 each include a cylindrical cup with an edge to form a seal against the first shell of a scallop. At least this edge of each of the suction grips 1370, 1372, 1374, 1376, 1378, 1380 could be made from rubber or another flexible material to help form the seal. The flexibility and deformability of the suction grips 1370, 1372, 1374, 1376, 1378, 1380 could provide a form of self-adjustability to accommodate different sizes and/or shapes of scallop shells. The clamping actuators 1382, 1384, 1386 could also or instead provide a form of self-adjustability, as each clamping actuator could move a different distance towards the holders in the lanes 120, 122, 124, 126, 128, 130.

After a seal is formed between a scallop shell and a suction grip, a vacuum could be created in the space defined by the shell and the suction grip. This creates suction by which each of the suction grips 1370, 1372, 1374, 1376, 1378, 1380 can hold the first shell of a respective scallop. The vacuum could be created using a vacuum pump and delivered to the suction grips 1370, 1372, 1374, 1376, 1378, 1380 through one or more tubes and valves, for example. A venturi arrangement could also or instead be used to create the suction. The engaged state of the suction grip arrangement 1306 is illustrated in FIGS. 14, 16, 18 and 20, and is perhaps best seen in FIG. 20.

Variations to the clamping system 1302 are contemplated. For example, the clamping actuators 1362, 1364, 1366, 1382, 1384, 1386 could include other types of actuators instead of or in addition to the pneumatic actuators. In addition, any or all of the springs 1350, 1352, 1354, 1356, 1358, 1360 could instead be replaced with other components to contact and press against the second shells of scallops, such as inflatable bladders.

As noted above, the use of multiple different forms of clamping in the clamping system 1302, including the spring arrangement 1304 and the suction grip arrangement 1306, could provide improved clamping of scallops. For example, the combination of clamping the second shell of a scallop toward the first shell using a spring and holding the first shell using a suction grip could provide an increased holding force on the scallop and/or provide a degree of redundancy when one form of clamping might be inadequately clamping a scallop. However, in some embodiments, only one of the spring arrangement 1304 and the suction grip arrangement 1306 could be used in a clamping system for a muscle cut station.

When the machine 100 is in use, the conveyor 102 delivers rows of holders loaded with scallops to the muscle cut station 108. A row of holders is moved into alignment with the clamping system 1302 during a movement period of the conveyor 102, and is held in alignment with the clamping system 1302 during a subsequent dwell period. During the movement period, the clamping system 1302 is disengaged. When the row of holders is aligned with the clamping system 1302, the row of holders is aligned underneath of the spring arrangement 1304 and above the suction grip arrangement 1306. Each of the holders in the row is disposed between one of the pairs of springs 1350, 1352, 1354, 1356, 1358, 1360 and one of the suction grips 1370, 1372, 1374, 1376, 1378, 1380. An example configuration of the shell cut station 108 immediately after a movement period of the conveyor 102 is illustrated in FIGS. 13, 15, 17 and 19.

During the dwell period of the conveyor 102, and/or responsive to alignment of the row of holders with the clamping system 1302, the clamping system is engaged to clamp each scallop in the row of holders. Engaging the clamping system 1302 includes engaging both the spring arrangement 1304 and the suction grip arrangement 1306. For the spring arrangement 1304, the clamping actuators 1362, 1364, 1366 lower the springs 1350, 1352, 1354, 1356, 1358, 1360 toward the row of holders. As a result, the springs 1350, 1352, 1354, 1356, 1358, 1360 abut the second shell of each scallop in the row of holders to clamp, push or otherwise force the second shell of the scallop toward the first shell. This also clamps, holds, pushes or forces the first shell of each scallop against the holder that holds the scallop.

Engaging the suction grip arrangement 1306 includes raising the suction grips 1370, 1372, 1374, 1376, 1378, 1380 towards the row of holders using the clamping actuators 1382, 1384, 1386. The suction grips 1370, 1372, 1374, 1376, 1378, 1380 extend through holes in the holders to contact the first shells of the scallops. Pressure could be applied by the clamping actuators 1382, 1384, 1386 to form a seal between the suction grips 1370, 1372, 1374, 1376, 1378, 1380 and the first shells of the scallops. The spring arrangement 1304 could also push the scallops against the suction grips 1370, 1372, 1374, 1376, 1378, 1380 to help form the seal. Suction is applied by the suction grips 1370, 1372, 1374, 1376, 1378, 1380 to the first shells of the scallops to hold the scallops against the suction grips. This suction could also hold the scallops against the holders.

An example configuration of the muscle cut station 108 after the clamping system 1300 has been engaged with the row of holders is illustrated in FIGS. 14, 16, 18 and 20. The engagement of the clamping system 1302 inhibits the scallops from moving relative to the holders during adductor muscle cutting.

During the same dwell period of the conveyor 102, the cutting actuators 1334, 1336, 1338, 1340, 1342, 1344 actuate or operate the cutting blades 1322, 1324, 1326, 1328, 1330, 1332 to cut the adductor muscle from the second shells of scallops held by the row of holders. This operation by the cutting actuators 1334, 1336, 1338, 1340, 1342, 1344 could be responsive to alignment of the row of holders with the clamping system 1302 and/or responsive to clamping by the clamping system.

The operation of the cutting actuators 1334, 1336, 1338, 1340, 1342, 1344 includes moving the cutting blades 1322, 1324, 1326, 1328, 1330, 1332 from a first position out of contact with a scallop (shown in FIGS. 13, 15, 17 and 19) to a second position (shown in FIGS. 14, 16, 18 and 20) in which at least a portion of the cutting blade is between the shells of the scallop. In some embodiments, the cutting actuators 1334, 1336, 1338, 1340, 1342, 1344 rapidly move or fire the cutting blades 1322, 1324, 1326, 1328, 1330, 1332 from their first position to their second positon. The cutters 1310, 1312, 1314, 316, 1318, 1320 are oriented at an angle such that when the cutting blades 1322, 1324, 1326, 1328, 1330, 1332 are moved to their second position, the cutting blades are expected to extend through the openings in the shells of the scallops and strike or contact an inside surface of the second shells of the scallops. After initially striking the inside surfaces of the second shells, the cutting blades 1322, 1324, 1326, 1328, 1330, 1332 follow the inside surfaces as they are moved from their first position to their second position. In the case that the cutting blades 1322, 1324, 1326, 1328, 1330, 1332 are flexible, the cutting blade could deform and flatten against the inside surfaces of the second shells as they follow the inside surfaces. This motion could cut the adductor muscle from the second shell. The cutting actuators 1334, 1336, 1338, 1340, 1342, 1344 then retract the cutting blades 1322, 1324, 1326, 1328, 1330, 1332 from between the shells of the scallops by moving the cutting blades from their second positon to their first positon.

Following the return of the cutting blades 1322, 1324, 1326, 1328, 1330, 1332 to their first position, the clamping system 1302 could disengage to release the scallops in the holders and permit the holders to move freely in a subsequent movement period of the conveyor 102. To disengage the clamping system 1302, the springs 1350, 1352, 1354, 1356, 1358, 1360 and the suction grips 1370, 1372, 1374, 1376, 1378, 1380 release the shells of the scallops and move away from the scallops to the configuration shown in FIGS. 13, 15, 17 and 19. The row of holders holding the scallops are then moved out of alignment with the clamping system 1302 in the subsequent movement period of the conveyor 102.

Figure 24:
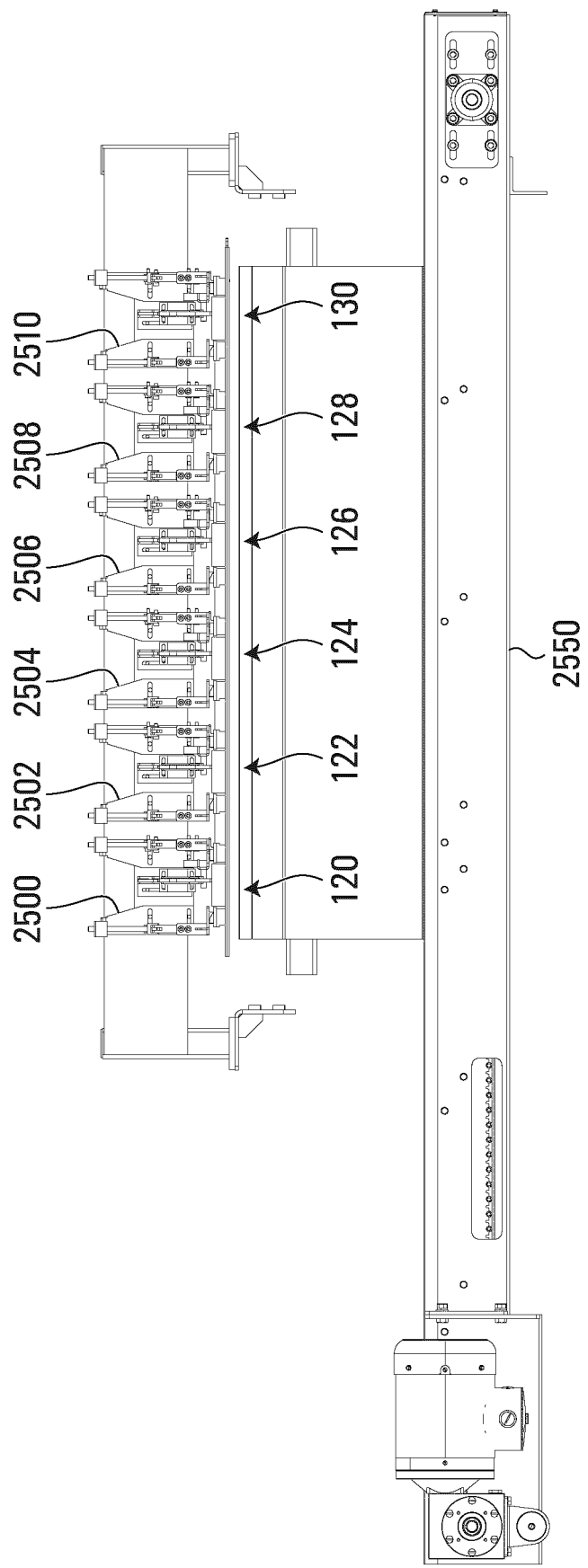
FIG. 24 is a plan view of the front of a shell detach station in the scallop processing machine shown in FIGS. 1 and 2.
Figure 25:
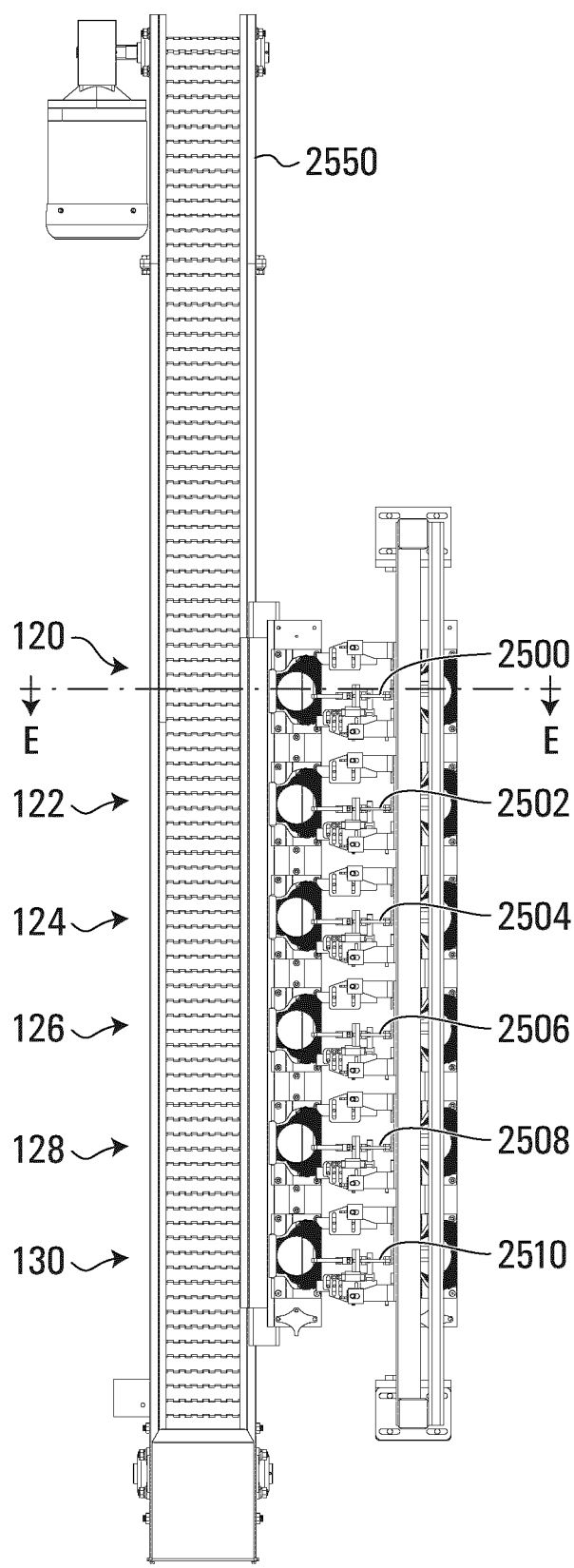
FIG. 25 is a plan view of the top of the shell detach station shown in FIG. 24.
Figure 26:
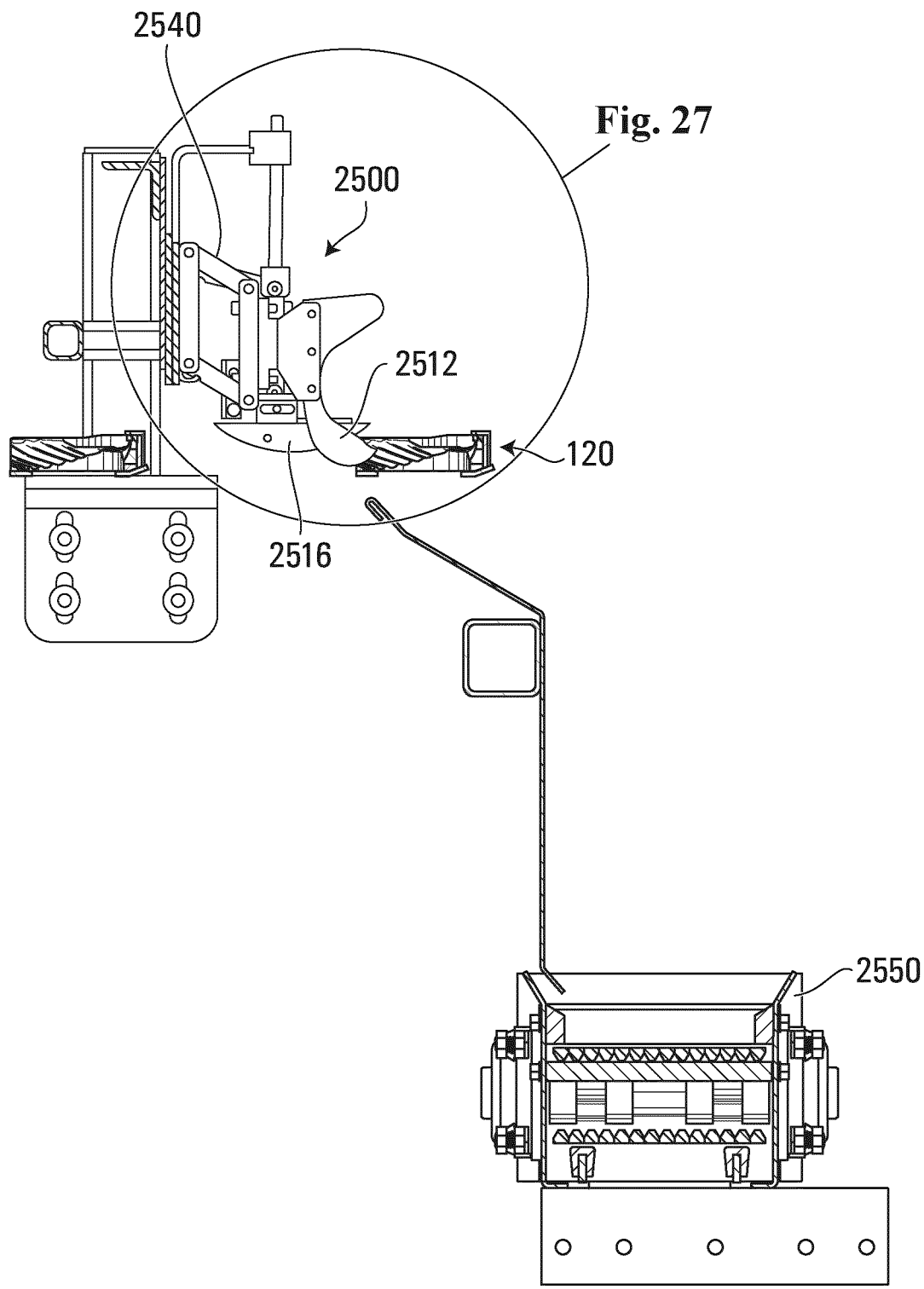
FIG. 26 is a cross-sectional view of the shell detach station shown in FIG. 25, along the line E-E in FIG. 25.
Figure 27:
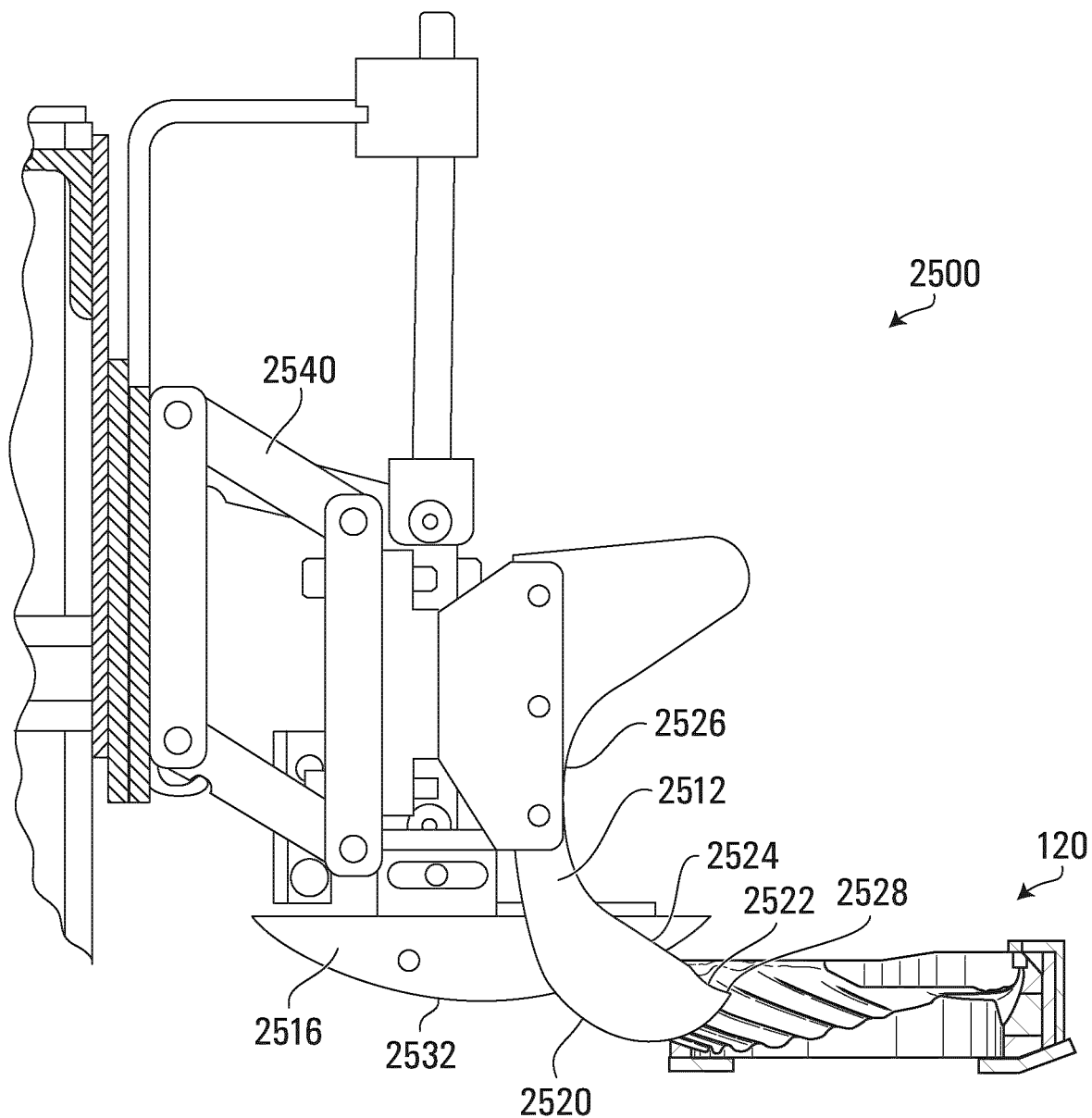
FIG. 27 is a magnified cross-sectional view of the shell detach station shown in FIG. 25, along the line E-E in FIG. 25.

The shell detach station 110 of the machine 100 is provided to detach the second shell from the first shell of a mollusc. FIG. 24 is a plan view of the front (relative to the motion of holders on the conveyor 102) of the shell detach station 110, FIG. 25 is a plan view of the top of the shell detach station, FIG. 26 is a cross-sectional view of the shell detach station along the line E-E in FIG. 25, and FIG. 27 is a magnified cross-sectional view of the shell detach station along the line E-E in FIG. 25. In FIGS. 24 to 27, several panels and other components of the machine 100 are removed and no scallops are illustrated, so that the details of the shell detach station 110 are visible.

Figure 28:
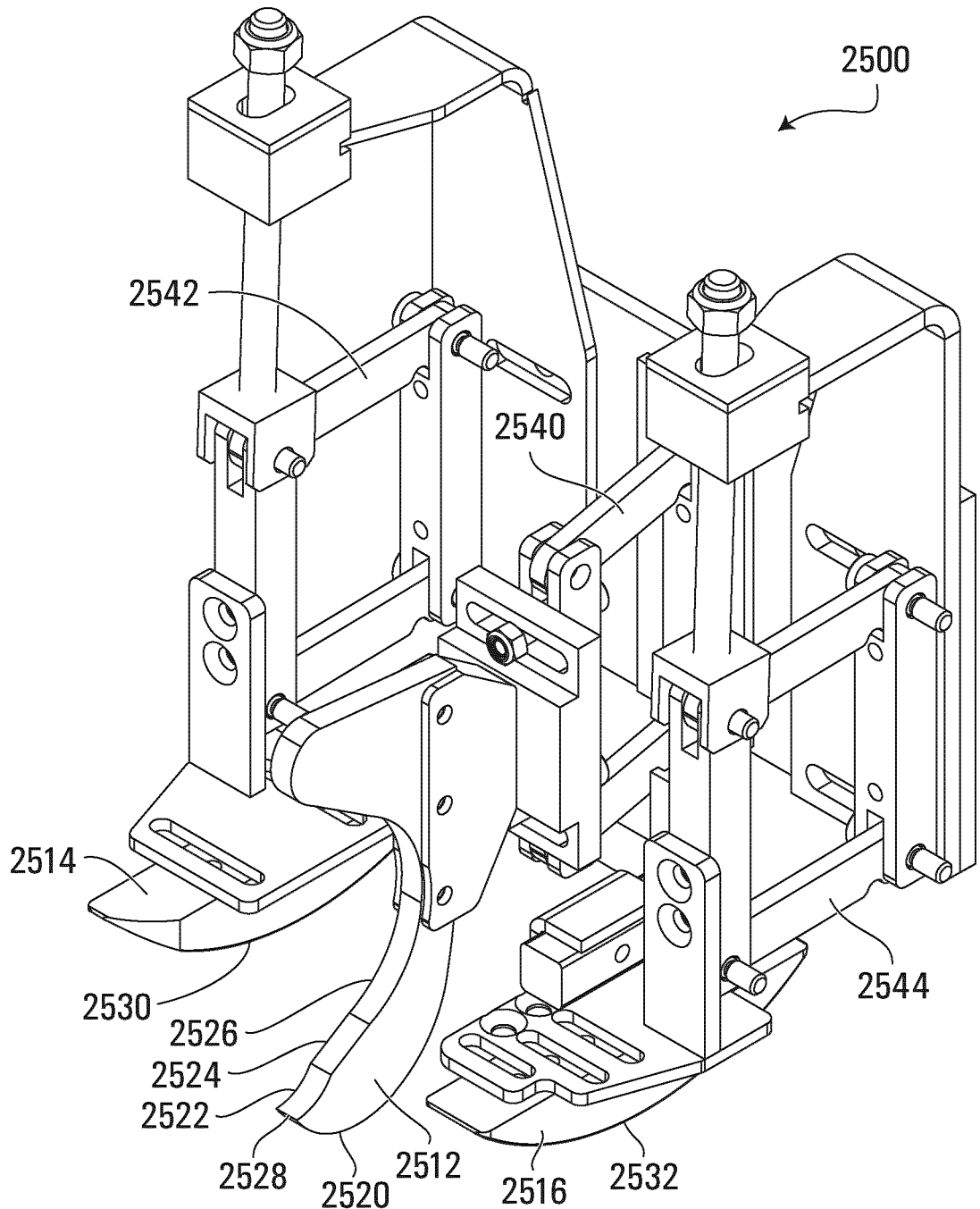
FIG. 28 is a perspective view of a shell detach mechanism in the shell detach station shown in FIGS. 24 to 27.

The shell detach station 110 includes multiple shell detach mechanisms 2500, 2502, 2504, 2506, 2508, 2510 and a waste conveyor 2550. FIG. 28 is a perspective view of the shell detach mechanism 2500. In FIG. 28, the shell detach mechanism 2500 is illustrated apart from the rest of the shell detach station 110 for greater clarity. The shell detach mechanism 2500 is a mechanical device that includes three members 2512, 2514, 2516 and three hinged supports 2540, 2542, 2544. The hinged supports 2540, 2542, 2544 are coupled to the members 2512, 2514, 2516, respectively, and to the frame 112. The hinged supports 2540, 2542, 2544 support the members 2512, 2514, 2516 and align the members with the lane 120.

The member 2512 is adjacent to and disposed between the members 2514, 2516. The members 2514, 2516 are positioned proximate to either side of the lane 120. The member 2512 is positioned between the members 2514, 2516, but is offset from the midpoint between those members, and is also offset from the center of the lane 120.

The member 2512 includes a convex bottom surface 2520, and a top surface having a concave portion 2522, a substantially flat portion 2524 adjacent to the concave portion, and another concave portion 2526 adjacent to the flat portion 2524. These portions of the top surface of the member 2512 form a generally semi-circular profile, as seen in FIG. 27, for example. An edge 2528 is formed by the bottom surface 2520 and the concave portion 2522 of the top surface. The edge 2528 faces the same direction as the front of the shell detach station 110 relative to the motion of holders on the conveyor 102. The profile of the lower part of the member 2512 could generally be referred to as cam-shaped, for example.

The members 2514, 2516 each include a respective convex bottom surface 2530, 2532. The profiles of the members 2514, 2516 can generally be referred to as circular or ski-shaped segments, for example.

In some implementations, the members 2512, 2514, 2516 are machined from a blank plate of material, and coupled to the hinged supports 2540, 2542, 2544 using one or more fasteners. This material could be flexible or rigid, and could include metal(s), ceramic(s), plastic(s), rubber, and wood, for example. The structure of the members 2512, 2514, 2516 is provided by way of example, and other numbers, shapes and/or sizes of members could also or instead be used in a shell detach mechanism. In some embodiments, a central member of a shell detach mechanism might have a top surface with only a single concave portion, similar to the concave portion 2526. In some embodiments, a shell detach mechanism could only have two members, with one member being similar to the member 2512 and the other member being similar to the member 2514.

By virtue of the hinged supports 2540, 2542, 2544, the heights of the members 2512, 2514, 2516 are individually self-adjustable relative to the holders in the lane 120. The hinged supports 2540, 2542, 2544 each include multiple beams or rods that are pivotally coupled to the frame 112 and pivotally coupled to the members 2512, 2514, 2516, respectively. These beams can rotate about the pivotal connections with the frame 112 and the members 2512, 2514, 2516 to raise or lower the members relative to the conveyor 102. This adjustability could also or instead be achieved using one or more springs connected between the members 2512, 2514, 2516 and the frame 112, for example.

The other shell detach mechanisms 2502, 2504, 2506, 2508, 2510 are similar to the shell detach mechanism 2500, and are supported in line with the lanes 122, 124, 126, 128, 130, respectively.

The waste conveyor 2550 is disposed below the shell detach mechanisms 2500, 2502, 2504, 2506, 2508, 2510 to collect and transport scallop shells away from the shell detach station 110. However, a waste conveyor might not be implemented in all shell detach stations. For example, a container could instead be implemented below the shell detach mechanisms 2500, 2502, 2504, 2506, 2508, 2510 to collect scallop shells. The container could be periodically emptied of shells to avoid overflow.

During operation of the machine 100, one or more scallops are carried by a row of holders on the conveyor 102 to the shell detach station 110. The shell detach mechanisms 2500, 2502, 2504, 2506, 2508, 2510 are coupled to the frame 112 in the example shown, and are stationary relative to a direction of movement of the conveyor 102. Hinged supports such as 2540, 2542, 2544 enable a shell detach mechanism to move up and down, substantially perpendicular to the conveyor 102, but in the example shown holders and scallops are moved past the shell detach mechanisms by the conveyor in order to remove the second shell from each scallop.

In the lane 120, the motion of the conveyor 102 brings a scallop into contact with one or more of the members 2512, 2514, 2516 of the shell detach mechanism 2500. The scallop is moved relative to the shell detach mechanism 2500 in a direction that is substantially perpendicular to an axis of the hinge of the scallop. This direction is also the same direction that is faced by the opening in the shells of the scallop. The conveyor 102 carries the scallop along the length of the shell detach mechanism 2500, which enables the shell detach mechanism to detach and remove the second shell of the scallop from the first shell. In some implementations, a single movement period of the conveyor 102 carries a scallop through the shell detach station 110, from when the scallop first contacts the shell detach mechanism 2500 to when the second shell of the scallop is removed and the scallop is out of contact with shell detach mechanism. In other implementations, multiple movement periods of the conveyor 102 are used to carry a scallop through the shell detach station 110, and the scallop remains in contact with the shell detach mechanism 2500 during at least one dwell period.

In some embodiments, instead of being coupled to the holders, a conveyor or other movement system could be coupled to one or more shell detach mechanisms. The holders could then be stationary during shell removal, and shell detach mechanisms are moved by the conveyor or other movement system relative to the holders to remove the second shells from scallops that are held by the holders. In some embodiments, both the holders and the shell detach mechanisms are coupled to different conveyors and/or other movement systems are moved relative to each other.

The operation of the shell detach mechanism 2500 to remove the second shell from the first shell of a scallop will now be discussed. As illustrated in FIG. 27, the edge 2528 is the element of the shell detach mechanism 2500 that is furthest towards the front of the shell detach station 110 relative to the motion of the conveyor 102. When no external forces are acting on the member 2512, the hinged support 2540 is supporting the member 2512 at a height that is approximately level with the height of the opening that has been cut into the shells of a scallop in the lane 120. However, the height of an opening in the shells of a scallop can be dependent on the size and/or shape of that scallop, and is therefore variable. As the conveyor 102 moves the scallop in its holder toward the member 2512, the edge 2528 enters the opening in the shells of the scallop. The bottom surface 2520 then contacts and slides against an inside surface of the first shell. The hinged support 2540 can adjust the height of the member 2512 as the bottom surface 2520 slides against the inside surface of the first shell to accommodate for the convex shape of the bottom surface and/or the shape of the first shell. The contact between the bottom surface 2520 and the inside surface of the first shell can inhibit movement of the first shell relative to the holder. For example, the weight of the member 2512 could clamp, hold, force or push the first shell against the holder.

In the example shown, adjusting the height of the member 2512 is achieved by the inside surface of the first shell pushing against the bottom surface 2520 of the member and lifting the member on the hinged support 2540. This form of height adjustment could be considered passive height adjustment, as the member 2512 is not lifted by a dedicated active component. Active height adjustment for any or all of the members 2512, 2514, 2516 is also contemplated. For example, the hinged supports 2540, 2542, 2544 could include pneumatic pistons and/or other actuators to actively adjust the heights of the members 2512, 2514, 2516 based on a sensed position of the members relative to a scallop and/or a holder.

The location of the member 2512 being offset from the center of the lane 120 could mean that the member 2512 has no contact, or has minimal contact, with the adductor muscle of the scallop that is still attached to the first shell. This may help reduce or minimize damage to the adductor muscle in the shell detach station 110.

The concave portion 2522 contacts and slides against the second shell of the scallop during motion of the conveyor 102. The angle and orientation of the concave portion 2522 could lift, separate, pry and/or peel the second shell away from the first shell. The separation of the shells is continued by the flat portion 2524 and the concave portion 2526. The hinge of the scallop could be opened during this process. A stop located toward the rear of the holder could provide a pivot point for the hinge of the scallop to encourage the separation of the second shell from the first shell, and to inhibit the scallop from sliding off of the rear of the holder.

At some point, the second shell could become vertically oriented and is substantially perpendicular to the first shell. The second shell could become wedged against the top of the concave portion 2526 and the holder. The edge 2528 could become approximately even with the hinge of the scallop and create a force that pushes the second shell away from the first shell. This force could break the hinge of the scallop, and cause the second shell to be flicked off of the first shell. The second shell could then fall onto the waste conveyor 2550, where it is removed from the shell detach station 110.

Due to the variations between different scallops, the second shell could break off from the scallop at any point of the shell detach station 110, and therefore the exact process for removing the second shell is not limited herein.

The members 2514, 2516 could also contact the scallop during relative motion between the scallop and the shell detach mechanism 2500. For example, the bottom surfaces 2530, 2532 could slide against the side edges of the first shell. The hinged supports 2542, 2544 could passively adjust the height of the members 2514, 2516 as the members move relative to the holder, to account for the convex shape of the bottom surfaces 2530, 2532 and/or the shape of the scallop. The weight of the members 2514, 2516 could clamp, force or hold the side edges of the first shell against the holder and inhibit movement of the scallop relative to the holder. These members 2514, 2516 may also be biased toward the holder, by one or more springs or other biasing elements for example, to increase the clamping force applied to the first shell.

Another feature of the example shell detach mechanism 2500 that may be relevant to shell clamping or holding during shell detach is the offset between the members 2514, 2516 relative to the member 2512 along a direction of relative motion between a holder and the shell detach mechanism. This offset in effect positions the members 2514, 2516 to contact the first shell in a holder at locations that are displaced from an axis around which lifting of the second shell by the member 2512 is likely to otherwise rotate a scallop, and may better resist such rotation of a scallop out of the holder during shell detach.

Figure 29:
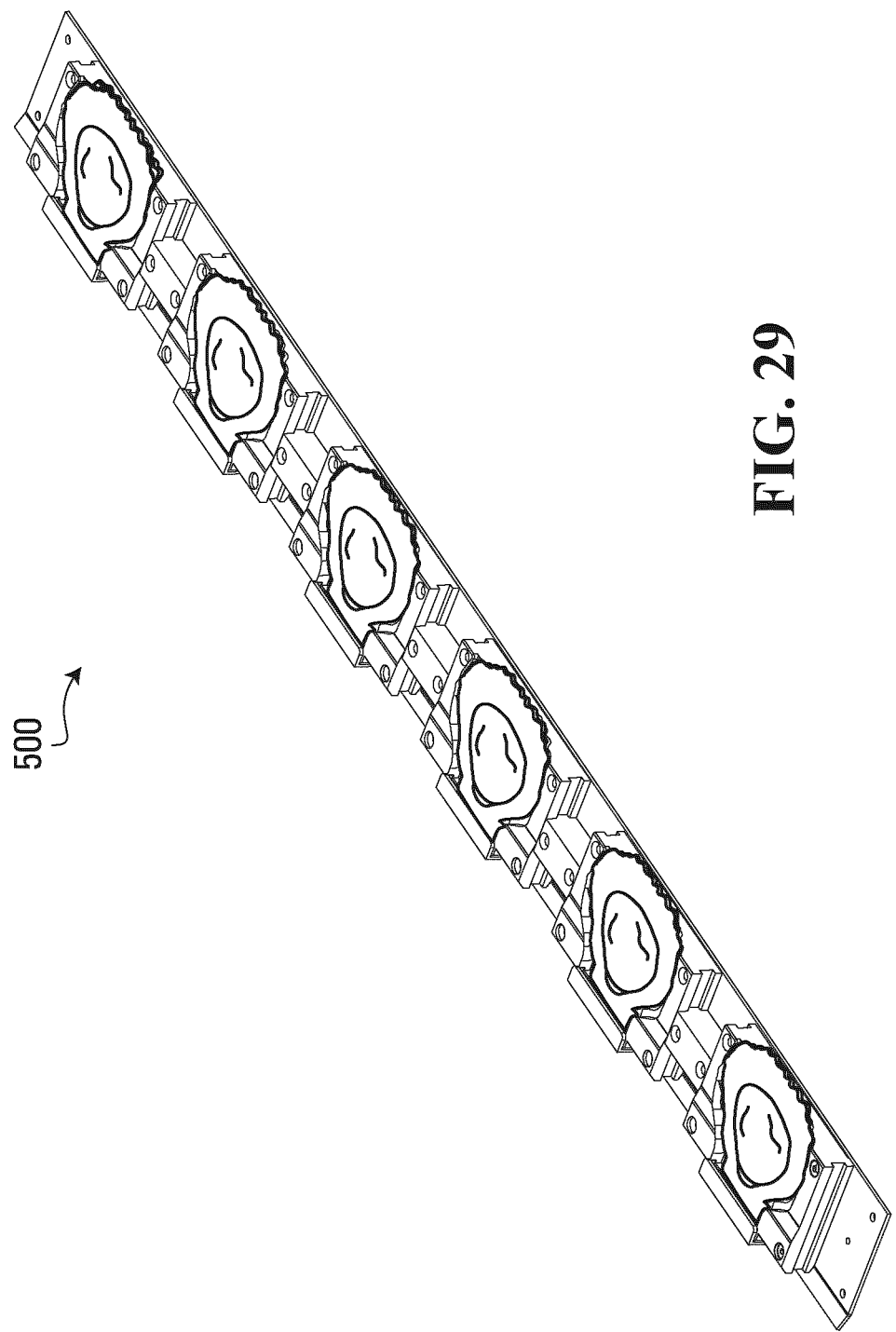
FIG. 29 is a perspective view of the row of holders illustrated in FIG. 12, with the top shell of the scallop removed.

The other shell detach mechanisms 2502, 2504, 2506, 2508, 2510 operate in a similar manner to the shell detach mechanism 2500 to remove the second shells of scallops in the lanes 122, 124, 126, 128, 130, respectively. An example of a row of holders holding scallops that have been processed in the shell detach station 106 is shown in FIG. 29. FIG. 29 is a perspective view of the row of holders illustrated in FIG. 12, with the second shell (illustratively the top shell) of the scallops 600 removed.

As noted above, some embodiments provide a shell detach mechanism having only two members, with one member being similar to the member 2512 and the other member being similar to the member 2514. During operation of this shell detach mechanism, the member that is similar to the member 2512 could clamp the first shell of a scallop on one side of the adductor muscle, while also separating the second shell from the first shell. The member that is similar to the member 2514 could clamp the first shell of the scallop on the other side of the adductor muscle. Thus, both sides of the first shell could be clamped by the two members during operation of the shell detach mechanism.

In the machine 100, following shell removal at the shell detach system 110, the scallops are removed from the machine. For example, the scallops could fall into a container or onto a conveyor, and be transported for further processing. The conveyor 102 could also be extended beyond the shell detach station 110 to accommodate additional stations for further processing the scallops. In some embodiments, the further processing could include removing the viscera and/or cutting the adductor muscle from the first shell of the scallops.

In some embodiments, a scallop processing machine has a loading station, a shell cut station, a muscle cut station, a shell detach station, and one or more additional stations for removing the viscera and/or cutting the adductor muscle from the first shell of the scallops. Scallops could be delivered between all of these stations using a chain conveyor, for example. Removing the viscera could include directing one or more air blasts to loosen the viscera from the first shell of a scallop, and then using a vacuum intake to pull the viscera away from the first shell, for example. Cutting the adductor muscle from the first shell could be implemented by a station including a cutting system and a clamping system. This cutting system and clamping system could be similar to the cutting system 1300 and the suction grip arrangement 1306. For example, the clamping system could include suction grips to hold the first shell of the scallop, and the cutting system could actuate cutters at a downwards oblique angle to contact the inside surface of the first shell and follow the inside surface of the first shell to cut the adductor muscle from the first shell. The adductor muscle could then fall away from the first shell and could be collected in a container or moved by a chute or a conveyor, for example.

Any or all of the components of the machine 100 could be controlled using a controller that is coupled to the machine. In some implementations, the controller controls the motion of the conveyor 102, which includes controlling the timing of the movement periods and dwell periods of the conveyor. In some implementations, the controller could control any or all of the actuators in the machine 100, which includes controlling the timing of the actuators relative to the motion of the conveyor. For example, the controller could control the clamping actuators 710, 712, 714, 716 and the saw actuator 706 of the shell cut station 106 to cut an opening into the shells of at least one scallop during a dwell period of the conveyor 102. The controller could also or instead control the clamping actuators 1362, 1364, 1366, 1382, 1384, 1386 and the cutting actuators 1334, 1336, 1338, 1340, 1342, 1344 of the muscle cut station 108 to cut the adductor muscle from the second shell of at least one scallop during a dwell period of the conveyor 102. Pneumatic actuators could be controlled using magnetically actuated switches that control the flow of compressed air to pneumatic pistons, for example.

The timing between the motion of the conveyor 102 and the operation of various actuators could be important to the functioning of the machine 100, and could be actively monitored by the controller. In some implementations, the machine 100 includes one or more sensors and/or detectors that are provided at any or all of the stations 104, 106, 108, 110. Proximity sensors, for example, could detect the presence of a row of holders and/or scallops. This information could be used to control the timing of actuators in the machine 100.

FIG. 30 is a block diagram illustrating an example control system 3000. The control system 3000 includes a controller 3002 and one or more user interface(s) 3004. The controller 3002 could be implemented, for example, using hardware, firmware, one or more components that execute software stored in one or more non-transitory memory devices, such as a solid-data memory device or a memory device that uses movable and/or even removable storage media. Microprocessors, Application Specific Integrated Circuits (ASICs), Field Programmable Gate Arrays (FPGAs), and Programmable Logic Devices (PLDs) are examples of processing devices that could be used to execute software. The controller 3002 is coupled to one or more detector(s), sensor(s), and/or controlled component(s) such as actuators and conveyors, for example.

The user interface(s) 3004 could include devices that allow a user to manually or remotely input information, actions and/or requests into the control system 3000. Examples of user input devices include keyboards, computer mice, touch screens, buttons, dials and switches. The user interface(s) 3004 could also or instead include electronic displays or other devices that output information to a user. Although represented as a direct connection in FIG. 30, the controller 3002 could actually be located remotely from the user interface(s) 3004. The user interface(s) 3004 could include both local components, to display alerts and/or other information to an operator of an apparatus, and remote components at a remote or central monitoring location, for example.

Although the machine 100 is discussed above primarily in the context of processing scallops, the same machine or a similar machine could also or instead be used to process other molluscs such as oysters, mussels and clams, for example. Some components of the machine 100 might be varied or adjusted to accommodate other types of molluscs. For example, the size and shape of the holders could be adjusted based on the size and shape of the mollusc being processed. Other types of adaptations may be or become apparent to those skilled in the art. Thus, the embodiments disclosed herein in the context of scallops are intended for illustrative purposes only, and such embodiments may be applied or adapted to other molluscs.

The implementation of a scallop processing machine could depend on whether the scallops to be processed are alive or dead. A live scallop could have a relatively strong attachment between the adductor muscle and the shells of the scallop. This could provide a stronger holding force that pulls the shells together. The hinge of a live scallop might also provide a relatively strong holding force to keep the shells together. As such, a muscle cut station that is designed for use with live scallops might not hold or clamp the second shells of the scallops. Suction grips could be used to hold first shells of the scallops, and the strength of the connection between the first shell and the second shell of a scallop could prevent the second shell from breaking off unintentionally due to a cutting blade striking the inside surface of the second shell.

Clamping systems such as those disclosed herein may be useful in enabling a processing machine to process dead animals such as cooked animals, or both dead animals and live animals. Shell clamping might not be as important for live animals as dead animals, but shell clamping may be used to enable both live and dead animal processing by the same machine instead of requiring sorting of live animals from dead animals and different machines for processing live animals or dead animals. Processing of both dead animals and live animals using the same machine instead of different machines may provide savings in equipment cost, equipment space requirements, labor cost, and/or efficiency, for example.

Scallop processing machines that are designed for use with dead animals might not include a muscle cut station. Instead, the relatively weak connection between the adductor muscle and the second shell of a scallop could be broken at the shell detach station. However, some of the adductor muscle could remain on the second shell and be lost in this process, and therefore the use of a muscle cut station could increase yields. Top clamping using springs, for example, could be implemented in a muscle cut station for dead scallops to prevent the second shells of these scallops from breaking off unintentionally due to cutting blades striking the inside surfaces of the second shells.

The embodiments described above largely relate to systems and apparatus for processing scallops and other molluscs. Methods are also contemplated.

FIG. 31 is a flow diagram illustrating an example method 3100 according to an embodiment. Step 3102 includes moving multiple holders between processing stations, each holder being provided to hold a respective mollusc by a first shell of the mollusc. Moving the holders could be performed using a conveyor or other movement system, for example. Step 3104 includes processing the molluscs at the processing stations. The processing stations could include one or more of: a loading station, a shell cut station, a muscle cut station and/or a shell detach station as disclosed herein, for example. In some implementations, the method 3100 could be a method of use for the machine 100.

FIG. 32 is a flow diagram illustrating another example method 3200 according to an embodiment. Step 3202 includes providing a multiple holders, each holder being provided to hold a respective mollusc by a first shell of the mollusc, and step 3204 includes providing processing stations for processing the molluscs. These processing stations could include one or more of: a loading station, a shell cut station, a muscle cut station and/or a shell detach station as disclosed herein, for example. Step 3206 includes providing a conveyor, coupled to the holders, to move the molluscs between the processing stations. Optionally, the method 3200 could further include a step (not shown) of providing a controller such as the controller 3002, for example.

In some implementations, the method 3200 could be a method for the production of the machine 100 or components thereof. Although the steps 3202, 3204, 3206 are illustrated as separate steps, they need not be separate in all embodiments. Moreover, it should be appreciated that holders, conveyors and processing stations need not necessarily be provided by directly producing or manufacturing them. For example, holders, conveyors and processing stations could be provided by purchasing or acquiring them from a manufacturer or producer, for example. Therefore, "providing" as used herein is not restricted to, and need not necessarily involve, production or manufacturing by an entity that assembles or uses any of the disclosed embodiments.

The example methods 3100, 3200 are illustrative of some embodiments. Examples of various ways to perform the illustrated operations, additional operations that may be performed in some embodiments, or operations that could be omitted in some embodiments, could be inferred or apparent from the description and drawings. Further variations may be or become apparent.

We claim:
1. A system comprising:
a plurality of holders, each holder of the plurality of holders to hold a respective mollusc by a first shell of the mollusc and being alignable with other holders of the plurality of holders in an alignment direction, each respective mollusc having a pair of shells including the first shell and a second shell;

a conveyor comprising a plurality of lanes of the holders, each of the lanes being aligned in a direction of motion of the conveyor and the alignment direction being perpendicular to the direction of motion of the conveyor;

a cutter operable to cut the shells of the molluscs; and an actuator, coupled to the cutter, to operate the cutter responsive to alignment of multiple holders of the plurality of holders in the alignment direction, to cut an opening into the shells of the respective mollusc held by each holder of the multiple holders that are aligned in the alignment direction.

2. The system of claim 1, further comprising:

a clamping system to clamp the second shell of each mollusc toward the first shell.

3. The system of claim 1, comprising:

processing stations; and the conveyor to move the molluscs between processing the stations, the processing stations comprising:

a shell cut station, comprising the cutter and the actuator, to cut the opening into the shells of each respective mollusc held by each holder of the multiple holders that are aligned in the alignment direction, a muscle cut station to cut an adductor muscle that is attached to the shells from the second shell through the opening in the shells of each respective mollusc, and a shell detach station comprising a respective shell detach mechanism for each of the lanes of the holders, to detach the second shell from the first shell of each respective mollusc, each shell detach mechanism comprising:

a first member to inhibit movement of the first shell of a respective mollusc relative to a respective holder in the respective lane of the shell detach mechanism, the first member comprising a convex surface to slide against the first shell during relative motion between the mollusc and the shell detach mechanism and inhibit movement of the mollusc relative to the holder, and a second member, disposed adjacent to the first member, to enter the opening cut into the shells of the mollusc held by the holder in the respective lane of the shell detach mechanism and detach the second shell from the first shell of the respective mollusc, the second member comprising a first surface to slide against an inside surface of the first shell to inhibit movement of the first shell relative to the holder during relative motion between the mollusc and the shell detach mechanism, and a second surface to slide against the second shell to separate the second shell from the first shell during relative motion between the mollusc and the shell detach mechanism.

4. The system of claim 3, each shell detach mechanism further comprising:

a third member to inhibit movement of the first shell relative to the holder in the respective lane of the shell detach mechanism, the second member being disposed between the first member and the third member, the third member comprising a convex surface to slide against the first shell during relative motion between the mollusc and the shell detach mechanism and inhibit movement of the mollusc relative to the holder.

5. The system of claim 3, wherein the conveyor is configured to move the molluscs relative to the shell detach mechanisms.

6. The system of claim 5, wherein each shell detach mechanism is stationary.

7. The system of claim 3, further comprising:

a conveyor, coupled to each shell detach mechanism, to move each shell detach mechanism relative to a respective mollusc.

8. The system of claim 7, wherein each holder is stationary during movement of each shell detach mechanism.

9. The system of claim 3, wherein the second member comprises an edge formed by the first surface and the second surface, wherein during relative motion between the respective mollusc and the respective shell detach mechanism:

the edge enters the opening, the first surface slides against the inside surface of the first shell to inhibit movement of the first shell relative to the holder, and the second surface slides against the second shell to separate the second shell from the first shell.

10. The system of claim 3, wherein:

each mollusc further has a hinge connecting the shells, the opening is cut into a side of the shells of each mollusc that is substantially opposite the hinge, and the relative motion between each mollusc and a respective shell detach mechanism is in a direction that is substantially perpendicular to an axis of the hinge of each mollusc.

11. The system of claim 10, wherein each holder comprises a stop to abut the hinge of a respective mollusc, the stop being oriented toward a rear of the holder relative to a direction of motion of the holder during operation of the system.

12. The system of claim 3, wherein a height of the first member and a height of the second member of each shell detach mechanism are adjustable relative to a respective holder.

13. The system of claim 3, wherein each holder comprises a concavity to hold the first shell of a respective mollusc, wherein the concavity comprises a ribbed surface.

14. The system of claim 3, wherein the muscle cut station comprises a clamping system to clamp the second shell of each mollusc toward the first shell of each mollusc and to further hold the first shell, and a cutter operable to cut the adductor muscle from the second shell of each mollusc through the opening.

15. The system of claim 3, further comprising a controller to:

control a motion of the conveyor, the motion of the conveyor comprising a movement period and a dwell period, control the shell cut station to cut the opening into the shells of each respective mollusc held by each holder of the multiple holders that are aligned in the alignment direction during the dwell period, and control the muscle cut station to cut the adductor muscle from the second shell of at least one further mollusc during the dwell period.

16. The system of claim 1, wherein the cutter comprises a sawblade and the actuator is further to move the sawblade linearly between a first position and a second position, which are located on opposing sides of the conveyor and in the alignment direction.

17. A method comprising:

moving a plurality of holders between processing stations, each holder of the plurality of holders to hold a respective mollusc by a first shell of the mollusc, each respective mollusc having a pair of shells, including the first shell and a second shell, and an adductor muscle attached to the shells, the plurality of holders being arranged in a plurality of lanes that are aligned in a direction of motion of the holders between the processing stations;

processing the molluscs at the processing stations, the processing stations comprising:

a shell cut station to cut an opening into the shells of each respective mollusc, the shell cut station comprising a cutter operable to cut the shells of the molluscs; and an actuator, coupled to the cutter, to operate the cutter responsive to alignment of multiple holders of the plurality of holders in an alignment direction perpendicular to the direction of motion of the holders, to cut an opening into the shells of the respective mollusc held by each holder of the multiple holders that are aligned in the alignment direction, a muscle cut station to cut the adductor muscle from the second shell through the opening in the shells of each respective mollusc, and a shell detach station comprising a respective shell detach mechanism for each of the lanes of the holders, to detach the second shell from the first shell of each respective mollusc, each shell detach station comprising:

a first member to inhibit movement of the first shell of a respective mollusc relative to a respective holder in the respective lane of the shell detach mechanism, the first member comprising a convex surface to slide against the first shell during relative motion between the mollusc and the shell detach mechanism and inhibit movement of the mollusc relative to the holder, and a second member, disposed adjacent to the first member, to enter the opening cut into the shells of the mollusc held by the holder in the respective lane of the shell detach mechanism and detach the second shell from the first shell of the respective mollusc, the second member comprising a first surface to slide against an inside surface of the first shell to inhibit movement of the first shell relative to the holder during relative motion between the mollusc and the shell detach mechanism, and a second surface to slide against the second shell to separate the second shell from the first shell during relative motion between the mollusc and the shell detach mechanism.

18. A method comprising:

providing a plurality of holders, each holder of the plurality of holders to hold a respective mollusc by a first shell of the mollusc, each respective mollusc having a pair of shells, including the first shell and a second shell, and an adductor muscle attached to the shells, the plurality of holders being arranged in a plurality of lanes that are aligned in a direction of motion of the holders between the processing stations; and providing processing stations for processing the molluscs, the processing stations comprising:

a shell cut station to cut an opening into the shells of each respective mollusc, the shell cut station comprising a cutter operable to cut the shells of the molluscs; and an actuator, coupled to the cutter, to operate the cutter responsive to alignment of multiple holders of the plurality of holders in an alignment direction perpendicular to the direction of motion of the holders, to cut an opening into the shells of the respective mollusc held by each holder of the multiple holders that are aligned in the alignment direction, a muscle cut station to cut the adductor muscle from the second shell through the opening in the shells of each respective mollusc, and a shell detach station comprising a respective shell detach mechanism for each of the lanes of the holders, to detach the second shell from the first shell of each respective mollusc, each shell detach station comprising:

a first member to inhibit movement of the first shell of a respective mollusc relative to a respective holder in the respective lane of the shell detach mechanism, the first member comprising a convex surface to slide against the first shell during relative motion between the mollusc and the shell detach mechanism and inhibit movement of the mollusc relative to the holder, and a second member, disposed adjacent to the first member, to enter the opening cut into the shells of the mollusc held by the holder in the respective lane of the shell detach mechanism and detach the second shell from the first shell of the respective mollusc, the second member comprising a first surface to slide against an inside surface of the first shell to inhibit movement of the first shell relative to the holder during relative motion between the mollusc and the shell detach mechanism, and a second surface to slide against the second shell to separate the second shell from the first shell during relative motion between the mollusc and the shell detach mechanism; and providing a conveyor, coupled to the plurality of holders, to move the molluscs between the processing stations.

19. The method of claim 18, further comprising providing a controller to:

control a motion of the conveyor, the motion of the conveyor comprising a movement period and a dwell period;

control the shell cut station to cut the opening into the shells of each respective mollusc held by each holder of the multiple holders that are aligned in the alignment direction during the dwell period; and control the muscle cut station to cut the adductor muscle from the second shell of at least one further mollusc during the dwell period.

* * * * *

UNITED STATES PATENT AND TRADEMARK OFFICE
CERTIFICATE OF CORRECTION

PATENT NO. : 11,974,582 B2
APPLICATION NO. : 17/631543
DATED : May 7, 2024
INVENTOR(S) : Keith Lohnes et al.

It is certified that error appears in the above-identified patent and that said Letters Patent is hereby corrected as shown below:

In the Claims

At Column 27, Line 24, Claim 17:
"station" should be -- mechanism --

At Column 28, Line 19, Claim 18:
"station" should be -- mechanism --

Signed and Sealed this
Eighth Day of October, 2024

Katherine Kelly Vidal
*Director of the United States Patent and Trademark Office*